(12) United States Patent
Rogers et al.

(10) Patent No.: US 7,684,026 B2
(45) Date of Patent: Mar. 23, 2010

(54) FAULT TOLERANT WHEEL ALIGNMENT HEAD AND SYSTEM

(75) Inventors: Steven C. Rogers, Conway, AR (US); Adam C. Brown, Maumelle, AR (US); Eric Bryan, Conway, AR (US)

(73) Assignee: Snap-On Incorporated, Kenosha, WI (US)

( * ) Notice: Subject to any disclaimer, the term of this patent is extended or adjusted under 35 U.S.C. 154(b) by 305 days.

(21) Appl. No.: 11/829,414

(22) Filed: Jul. 27, 2007

(65) Prior Publication Data

US 2009/0027662 A1 Jan. 29, 2009

(51) Int. Cl.
*G01B 11/26* (2006.01)
(52) U.S. Cl. .................................. 356/139.09
(58) Field of Classification Search ....... 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| | | | | |
|---|---|---|---|---|
| 4,180,326 | A | * | 12/1979 | Chang .................. 356/139.09 |
| 5,592,383 | A | | 1/1997 | Rogers et al. |
| 5,781,286 | A | * | 7/1998 | Knestel ................. 356/139.09 |
| 6,075,589 | A | * | 6/2000 | Muller et al. .......... 356/139.09 |
| 6,282,469 | B1 | | 8/2001 | Rogers et al. |
| 6,690,456 | B2 | | 2/2004 | Bux et al. |
| 7,136,728 | B2 | | 11/2006 | Larson et al. |
| 2002/0070709 | A1 | * | 6/2002 | Small et al. .................. 320/150 |
| 2002/0095802 | A1 | | 7/2002 | Gray et al. |
| 2003/0154336 | A1 | * | 8/2003 | Ballantyne et al. .......... 710/110 |
| 2005/0060899 | A1 | | 3/2005 | Jackson et al. |
| 2005/0154497 | A1 | | 7/2005 | Strege et al. |
| 2005/0252308 | A1 | | 11/2005 | Hjelt et al. |
| 2006/0107116 | A1 | * | 5/2006 | Michaelis et al. ............. 714/25 |
| 2006/0152711 | A1 | * | 7/2006 | Dale et al. ............ 356/139.09 |
| 2006/0184296 | A1 | | 8/2006 | Voeller et al. |
| 2007/0127008 | A1 | * | 6/2007 | Ash .......................... 356/4.01 |
| 2007/0129860 | A1 | | 6/2007 | Voeller |

OTHER PUBLICATIONS

Partial International Search dated May 19, 2008, pp. 1-8.
Search Report dated Sep. 19, 2008.

* cited by examiner

*Primary Examiner*—Thomas H Tarcza
*Assistant Examiner*—Luke D Ratcliffe
(74) *Attorney, Agent, or Firm*—McDermott Will & Emery LLP

(57) ABSTRACT

A sensing head and system utilizes fault tolerant design and self-diagnosis. Alternative operation modes are provided when one or more functional modules or components fail. Unique designs provide redundant system resources. Self-diagnoses and tests are provided to isolate and identify sources of malfunctions.

24 Claims, 18 Drawing Sheets

FAULT TOLERANT WHEEL ALIGNMENT HEAD AND SYSTEM

TECHNICAL FIELD

The present subject matter relates to techniques and equipment for high reliability wheel alignment that are tolerant to faults, resistant to harsh operation environment, and capable of providing effective self-diagnosis.

BACKGROUND

Wheel alignment systems operate in a harsh environment that challenges the reliability and operability of the systems. Significant variations in temperature and humidity, and electrical noise common in automotive service facilities can disrupt the operation of the alignment systems and, in the case of cordless wheel alignment systems, the reliability and availability of wireless communications between alignment heads and console computer system. The equipment occasionally is dropped or collides with vehicles or other equipment. Additionally, many alignment systems are susceptible to single point failures that can render the entire system unusable even though only one minor component or device fails.

Furthermore, operators of wheel alignment systems often have limited skills or training in using the equipment. When an alignment system is not performing as expected, the operator has no way to know whether it is caused by improper operations, environment interferences, or actually by system malfunctions. In these cases, the operator may unnecessarily request the alignment system be serviced even though it is actually in perfect working condition. The unnecessary services and unavailability of alignment systems significantly reduce productivity and increase service and operation costs. Although some alignment systems provide crude self-diagnostic information, the information generally relates to a functional capability but does not identify a specific component.

Accordingly, wheel alignment systems that are highly reliable, tolerant to faults, resistant to harsh operation environment, and capable of providing effective self-diagnosis are highly desirable.

SUMMARY

This disclosure describes embodiments of fault-tolerant, highly reliable alignment heads and systems that provide alternative operation mode, such as using redundant system resources, and avoiding single point failures. Techniques and designs of effective self-diagnosis and communications with users related to system faults also are provided. An exemplary sensing head provides redundant system resources. The sensing head includes one or more functional modules, each of which is configured to perform a function usable in obtaining measurements for calculating wheel alignment parameters of a vehicle. The functional modules include at least one of a wireless communication interface module configured to communicate in a wireless manner with a computer system or a companion sensing head attached to the vehicle, a spatial relationship sensing module configured to measure a spatial relationship between the sensing head and the companion sensing head, an image sensing module configured to producing image data representing an image taken of a target associated with a vehicle wheel; and an illumination module configured to illuminate the target. A data processor is provided to calculate the measurements based on data received from the one or more functional modules. The functional modules provide operation redundancy by utilizing at least one of providing multiple sets of illumination devices in the illumination module, wherein at least one set is independent from another set and is configured to illuminate the target independently; providing multiple paths for communication with the computer system using the wireless communication module, wherein at least one of the paths is different from another path; providing multiple sets of illumination devices to the spatial relationship sensing module, wherein at least one set is independent from another set and is configured to independently generate a signal to the companion sensing head; and providing multiple processing units for implementing the data processor, wherein each processing unit is configured to independently perform the functions of the data processor.

According to another aspect of this disclosure, an exemplary sensing head is capable of providing self diagnostic information. The exemplary sensing head includes one or more functional modules, each of which is configured to perform a function usable in obtaining measurements for calculating wheel alignment parameters of a vehicle, and a data processor, coupled to the one or more functional modules, configured to process data. At least one of the functional modules is configured to perform a self test of a respective functional module. The data processor determines an operation condition of the respective functional module based on data related to the self test performed with respect to the respective functional module. If the data processor determines that the functional modules are working properly, a user interface conveys information indicating that the sensing head is in a normal operation condition.

According to another aspect of this disclosure, an exemplary sensing head utilizes a unique communication arrangement to achieve resource redundancy. The exemplary sensing head is for use in a wheel alignment system for producing data usable in calculating alignment parameters. The sensing head includes a housing for mounting on a wheel of a vehicle to be measured by operation of the wheel alignment system; and a wireless communication module configured to selectively establishing a first wireless communication path and a second wireless communication path between the sensing head and a remote computer system. A failure in one of the first wireless communication path and the second wireless communication path does not affect the operation the other communication path. The data generated by the sensing head is transmitted to the computer system via at least one of the first wireless communication path and the second wireless communication path.

According to still another aspect, an exemplary sensing head includes a unique multi-drop bus system that selectively couples only one of the one or more functional modules to a data processor via the bus system and isolates all other functional modules from the bus system.

Another aspect of this disclosure allows a sensing head to detect and provide information related to a drop event. An exemplary sensing head includes a housing for mounting on a wheel of a vehicle to be measured by operation of the wheel alignment system, a drop sensor configured to acquire data related to a drop of the sensing head, and a data storage device, coupled to the drop sensor, configured to store the data acquired by the drop sensor. A data processor may be provided to determine an occurrence of the drop based on the data acquired by the drop sensor.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Reference now is made in detail to the examples illustrated in the accompanying drawings and discussed below.

System Architecture

Figure 1:
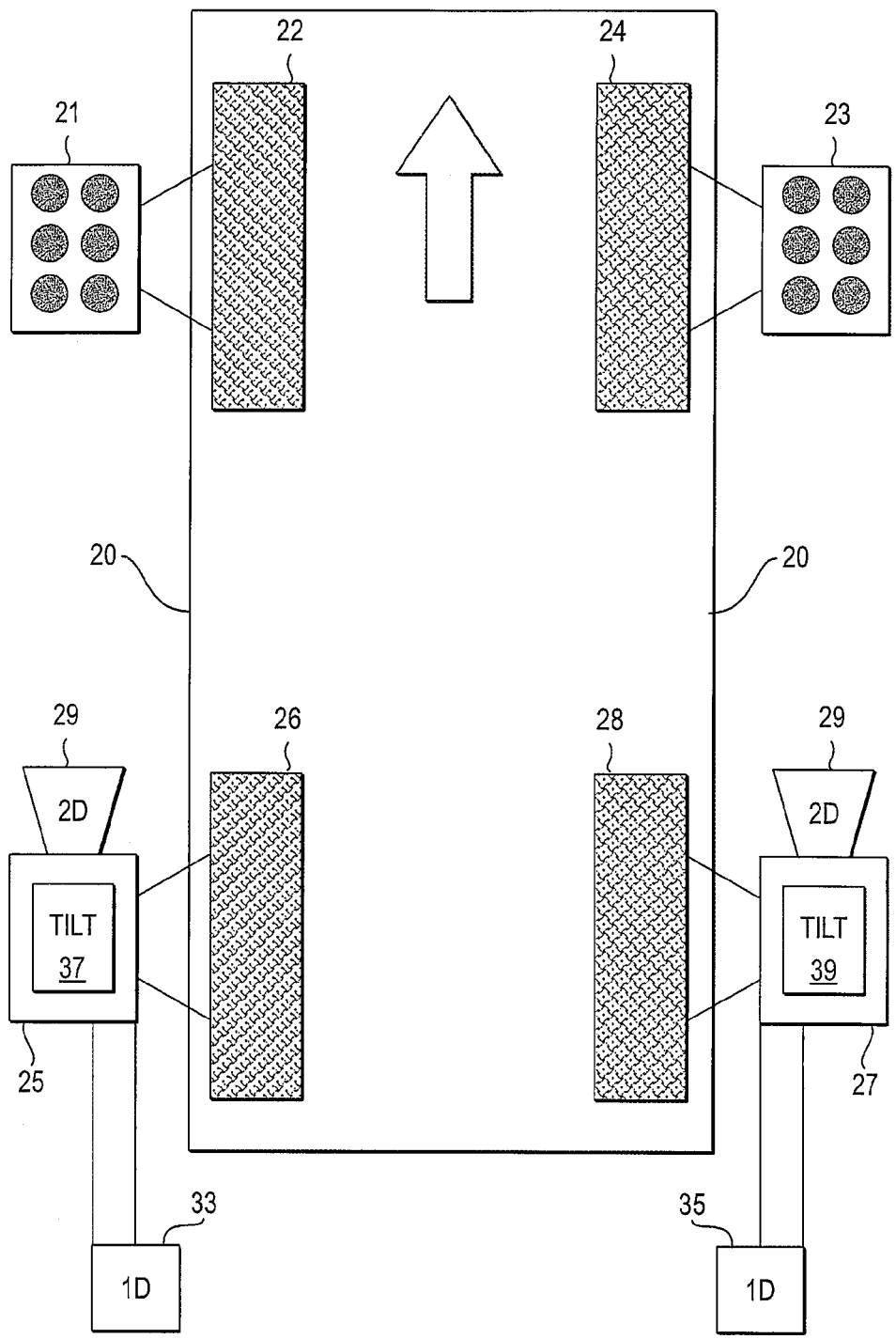
FIG. 1 diagrammatically illustrates a first arrangement of targets and active sensing heads in relation to vehicle wheels.

FIG. 1 depicts an exemplary alignment system embodying the teachings and techniques of this disclosure. Except for the wheels, elements of the vehicle are omitted for ease of illustration.

The wheel alignment system includes a pair of passive heads 21 and 23 mounted on respective wheels 22 and 24 of the vehicle, which are front steering wheels in this first example. The active sensing heads 25 and 27 are adapted for mounting in association with other respective wheels 26 and 28 of the vehicle, in this case the rear wheels. Each active sensing head includes an image sensor 29 or 31 for producing image data, which is expected to include an image of a passive target when the various heads are mounted to the respective wheels of the vehicle 20. In this first example, the image sensors 29 and 31 in the active sensing heads 25 and 27 are two dimensional (2D) imaging devices, e.g. cameras.

The heads 21 and 23 are passive in that they include targets but do not include any sensing elements. Each of the passive heads 21 and 23 includes a target of a type that may be observed by one of the image sensors 29 or 31 in the active heads 25 and 27. A target on a passive head 21 or 23, for image sensing by a sensor on another head, may be active or passive. An active target, such as a light emitting diode (LED), is a source driven by power to emit energy (e.g. IR or visible light) that may be detected by a sensor. A passive target is an element that is not driven by power and does not emit energy for detection by a sensor. Assuming an image sensor in head 25 or 27, a passive target would be an object that reflects (or does not reflect) light or other energy in a manner detectable by the respective image sensor. In the example, although the targets could comprise one or more light emitting elements, the targets comprise light and dark regions that can be detected when illuminated by other sources and imaged by cameras or the like in the active sensing heads 25 and 27.

Figure 1A:
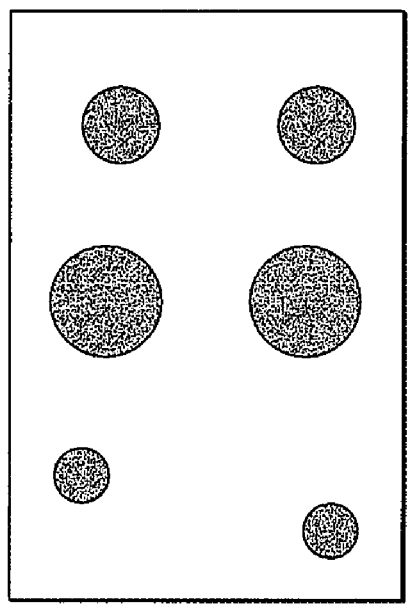
FIGS. 1A and 1B illustrate different types of targets that may be used on passive heads.
Figure 1B:
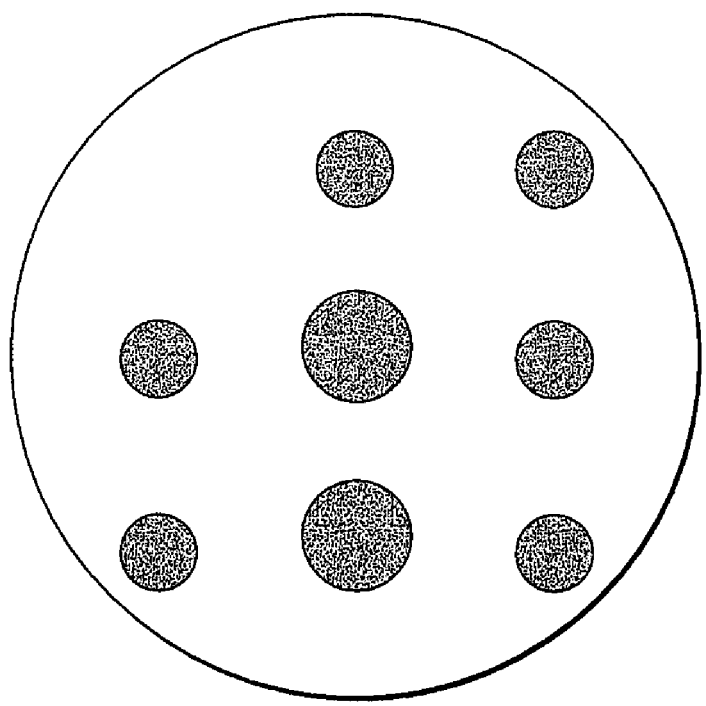

A first example of a target that can be used on either of the passive wheel heads 21 is illustrated in FIG. 1A. In this first example, the target is rectangular. A second example of a target that can be used on either of the passive wheel heads 21 is illustrated in FIG. 1B. In this second example, the target is circular. In each case, the target consists of a flat plate with a pattern of differently sized circles marked on or mounted on the surface of the plate in a pre-determined format and patter. Although specific patterns are shown FIGS. 1A and 1B, it will be evident that a large number of different patterns can be used on each target. For example, a larger or smaller number of dots may be included and other sizes and shapes can be used for the dots. As another example, multifaceted plates or objects can also be used for the targets. Many examples utilize a number of retro-reflective elements arranged to form each target. For further information, attention is directed to U.S. Pat. No. 5,724,743 to Jackson, the entire disclosure of which is incorporated herein by reference.

The system also includes a spatial relationship sensor associated with at least one of the active sensing heads 25 or 27. The spatial relationship sensor enables measurement of the spatial relationship between the active sensing heads 25 and 27 when the active sensing heads are mounted on wheels of the vehicle. In general, spatial relationship sensors may measure relative position and/or orientation, depending on the type of sensor used. A positional measurement refers to the relative position of the measured item from the perspective or in the coordinate system of the measuring device. Measurement of position generally uses a standard coordinate system such as Cartesian coordinates or polar coordinates. Orientation may be derived from a three-dimensional position measurement, or orientation may be measured independently of position. Orientation relates to the rotational position of the measured device with respect to the measuring device expressed in a standard coordinate system. Orientation is generally expressed in rotational angles in three orthogonal reference planes.

It will be readily apparent to someone skilled in the art that the wheel alignment systems discussed herein may be implemented with various different types of spatial relationship sensors. In this first example, the system uses two conventional (1D) angle sensors 33 and 35 to measure the relative angles of the active sensing heads 25 and 27, in the toe plane.

The active heads 25 and 27 also contain gravity sensors or the like to measure tilt, typically camber and pitch, of the head. In this first example, the head 25 includes one or more tilt sensors 37; and the head 27 includes one or more tilt sensors 39.

As shown in a more detailed example later (regarding FIG. 2), the system also includes a computer. The computer processes image data relating to observation of the targets and tilt data, from the active sensing heads. The computer also processes spatial relationship data from the at least one spatial relationship sensor. The data processing enables computation of at least one measurement of the vehicle.

Measurement using image processing techniques is fundamentally different than using conventional angle measurement technology in a wheel alignment system. Although basic image processing techniques are known to those skilled in the art, a brief description is presented for clarity. The image of a body varies according to the perspective from which such body is viewed and the variation in the image is directly related to and determinable from the perspective angle of the view path along which the body is viewed. Furthermore, it is known that it is possible to determine the perspective angles at which an object is viewed merely by relating the perspective image of that object with a true non-perspective image thereof. Conversely put, it is possible to determine the angles at which an object is orientated to a view path (or a plane perpendicular thereto) by comparing a perspective image of an object with a non-perspective image thereof.

In practice, a mathematical representation, or data corresponding to a true image (i.e. an image taken by viewing the target perpendicularly to its primary plane) and the dimensions of the target are preprogrammed into the memory of the computer so that, during the alignment process, the computer has a reference image to which the viewed perspective images of the targets can be compared.

The way that the computer calculates the orientation of the target is to identify certain geometric characteristics on the target, take perspective measurements of these and compare these measurements with the true image previously preprogrammed into the memory of the computer.

Furthermore, as the true dimensions of the target are preprogrammed into the memory of the computer, the method and apparatus of this invention can be used to determine the exact position of the wheels in three-dimensional space. This can be done by firstly determining the perspective image of certain of the elements of the pattern on the target (for example, the distances between circles) and comparing the dimensions of this image to the true dimensions of those elements. This will yield the distance that the element and, accordingly, the target is from the image sensor.

For the wheel alignment system discussed herein, the image sensor in the active head views a target attached to a wheel and produces image data which describes a perspective image of the target. The computer correlates the perspective image data for the targets with the true shape of the target. In so doing, the computer relates the dimensions of certain known geometric elements of the target with the dimensions of corresponding elements in the perspective image and by performing certain trigonometric calculations (or by any other suitable mathematical or numerical methods), calculates the alignment of the wheel of the vehicle. The computer can also calculate the three-dimensional position and orientation of the axis of rotation of the wheel (wheel axis) associated with the passive target.

For additional information regarding measurement based on processing of images of targets, attention again is directed to U.S. Pat. No. 5,724,743 to Jackson, the entire disclosure of which is incorporated herein by reference.

Figure 2:
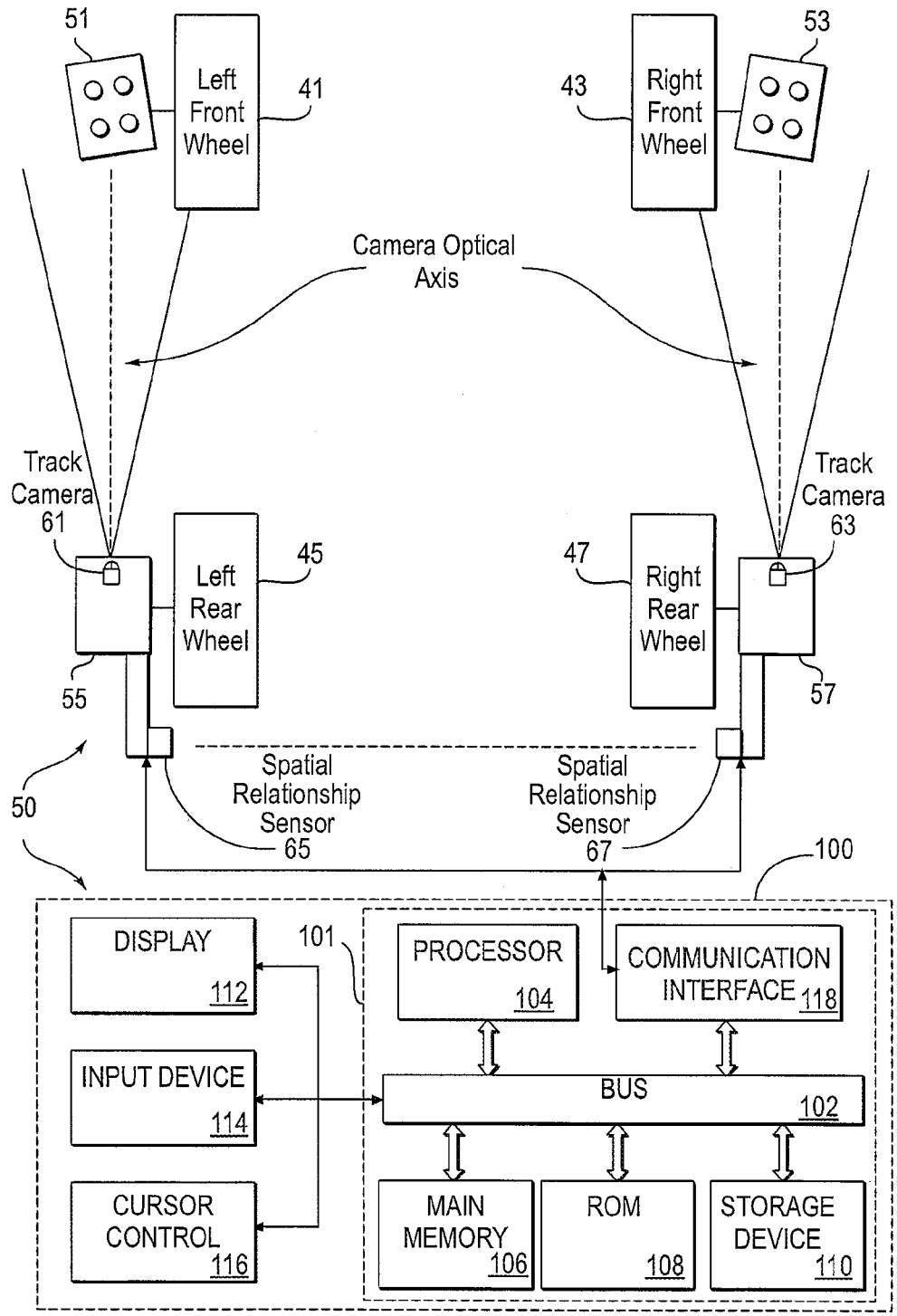
FIG. 2 is a functional block diagram of an exemplary wheel alignment system, with elements thereof mounted to wheels of a subject vehicle (although other elements of the vehicle are omitted for convenience).

FIG. 2 depicts a more comprehensive example of an exemplary wheel alignment system 50 as well as four wheels 41, 43, 45 and 47 of a vehicle (otherwise not shown, for simplicity). The system 50 includes four heads 51, 53, 55 and 57 for mounting on or otherwise in association with the wheels 41, 43, 45 and 47 as shown stylistically in the drawing. A variety of different types of mounting devices may be used. In this example, the passive heads 51 and 53 are mounted on the front wheels 41 and 43, and the front heads 51 and 53 use retro-reflective targets. When mounted on the wheels as shown, the retro-reflective targets face rearward, so as to be observable by the image sensors in the respective active sensing heads. The retro-reflective targets may be similar to those used in three-dimensional (3D) machine vision alignment systems. The heads 55 and 57 mounted on the rear wheels 45 and 47 are active sensing heads, in that they include image sensing elements. In this example, the heads 55 and 57 further include tilt and spatial relationship sensing elements, as discussed below, for obtaining information for processing by a host computer system 100 of the wheel alignment system 50. The host computer system 100 may be implemented as part of one of the heads, or implemented with a computer system, such as a stationary computer or a portable computer, remote to the heads. According one embodiment of this disclosure, data obtained by the heads 55 and 57 is transmitted to the host computer system 100 in a wireless manner using WIFI, Bluetooth, UWB (Ultra-Wideband), Zigbee, or any other suitable wireless technology.

An imaging sensor, such as an alignment camera, is positioned in each of rear heads. The optical axis of each such camera faces forward along the track of the vehicle, in order to measure the position and orientation of the targets attached to the front wheels. The cameras need not be directly on the track of the vehicle wheels, that is to say on the roll line of the wheels. The cameras need only to face alongside the wheel track sufficiently to view and capture images of the targets on the passive heads 51, 53 associated with the front wheels. In the example, the active sensing head 55 includes an image sensing module or the like containing an image sensor in the form of a camera 61 facing forward along the track of the left wheels. When so mounted, the field of view of the camera 61 includes the target portion of the passive head 51 mounted on the left front wheel 41. Similarly, the active sensing head 57 includes an image sensing module or the like containing an image sensor in the form of a camera 63 facing forward along the track of the right wheels. When so mounted, the field of view of the camera 63 includes the target portion of the passive head 53 mounted on the right front wheel 43.

One or more sensors are attached to the rear heads 55, 57 and positioned to measure a spatial relationship between the two active sensing heads. A variety of available sensing technologies may be used, and two examples are discussed, later. In the example illustrated in FIG. 2, the active sensing head 55 includes a sensor 65; and the active sensing head 57 includes a sensor 67. The sensors 65 and 67 in this application are used for sensing the relative angular relationship between the active sensing heads 55 and 57, whereas the image signals from the cameras 61 and 64 are processed to compute regular front wheel alignment parameters, such as camber and toe.

Each rear head 55 or 57 also incorporates one or more inclinometers, which are used as tilt sensors to measure the relative camber and pitch angles of each rear head to gravity. These inclinometers, for example, may comprise MEMS type devices designed to be integral to the track camera printed circuit board.

Figure 3:
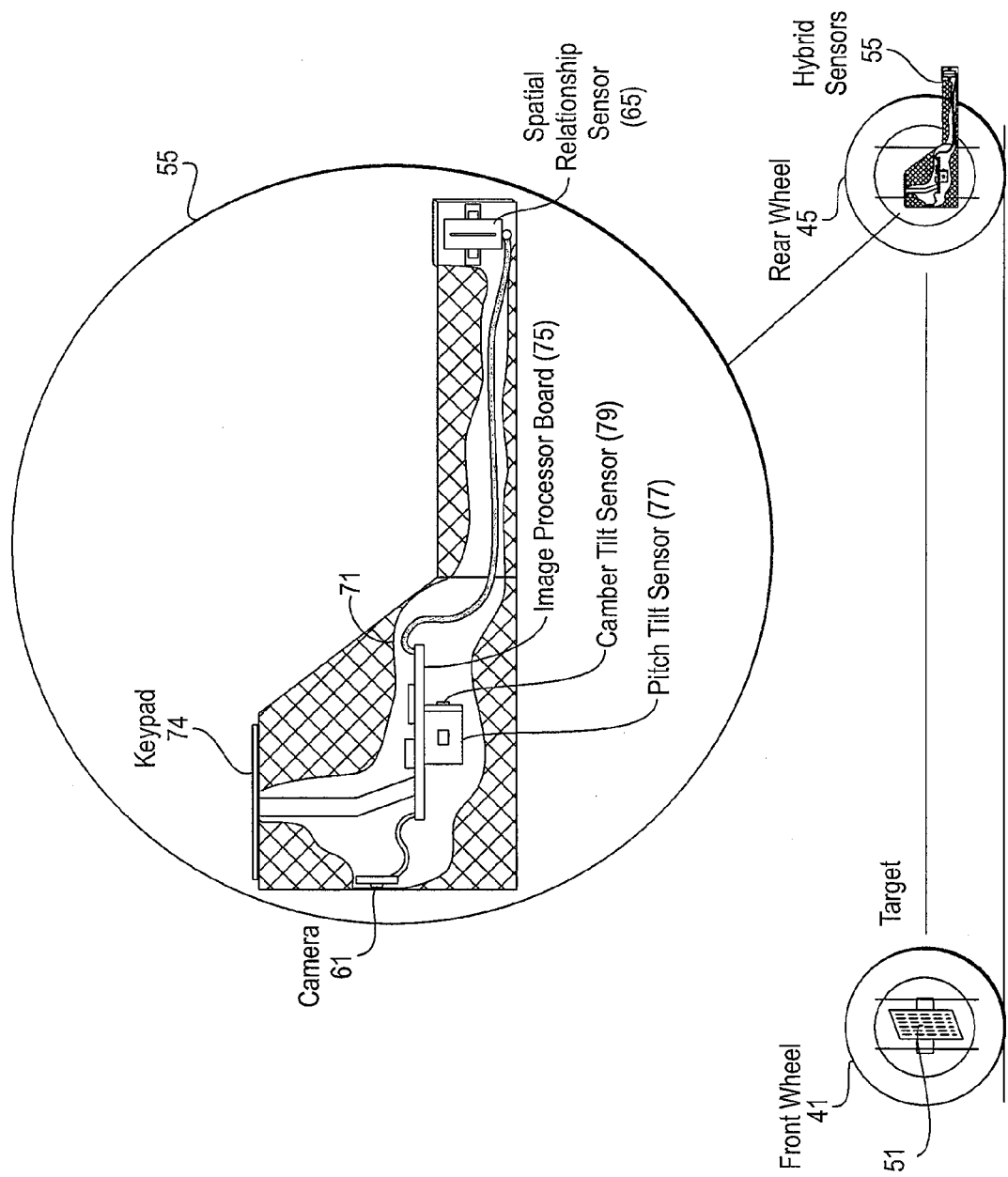
FIG. 3 is a side view of some of the wheel mounted components of the system, with one of the active sensing heads shown in a partial cross-sectional detail view.

FIG. 3 is a side view of some of the wheel mounted components of the system. This left side view shows the left front head 51, with its passive target, attached to the left front wheel 41. The side view also shows the left rear active sensing head 55, attached to the left rear wheel 45. FIG. 3 also provides an enlarged detail view, partially in cross section, of elements of the active sensing head 55.

As shown, the head 55 comprises a housing 71. Hardware for mounting the housing to the wheel is omitted for clarity. The housing 71 contains the forward facing track camera 61. In this example, the spatial relationship sensor 65 uses a beam angle detection technology, discussed later with regard to FIG. 6, although other types of sensors may be used. The housing also contains a user interface 74 for communicating with the user and a printed circuit board 75 containing the data processing electronics for processing the data from the camera(s) and other sensors and communications with the host computer. For purpose of forming the sensing head of an exemplary system, the board 75 also supports a pitch tilt sensor 77 and a camber tilt sensor 79. Although shown separately, the two tilt sensors 77, 79 may be elements of a single inclinometer module. The sensors 77, 79 communicate inclination readings to a processor on the board 75, for transmission with the camera data to the host computer system 100.

Figure 4:
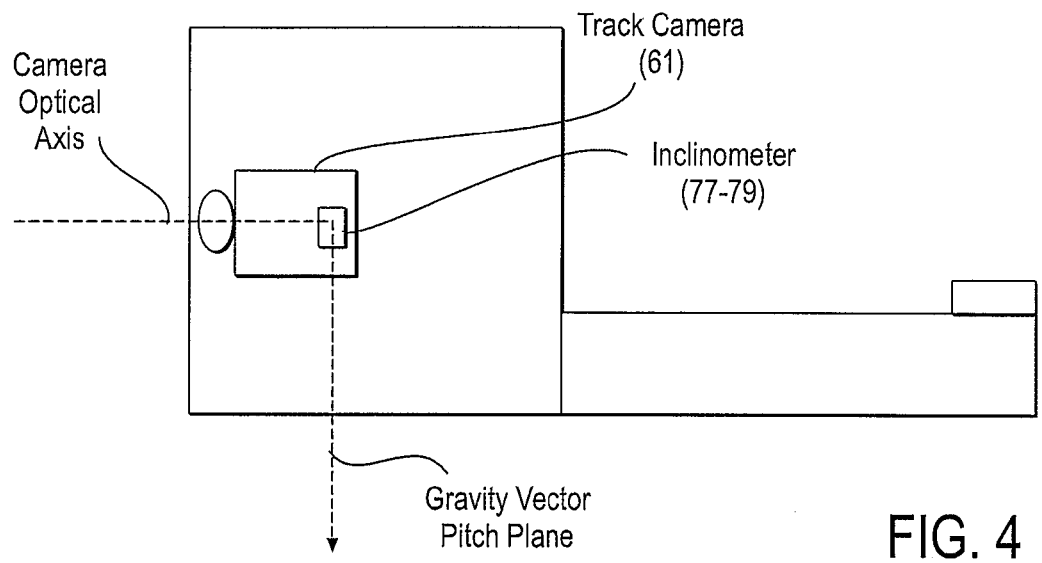
FIG. 4 is a side view of one of the active sensing heads useful in explaining the relationship of the camera axis to the pitch plane of the measured gravity vector.
Figure 5:
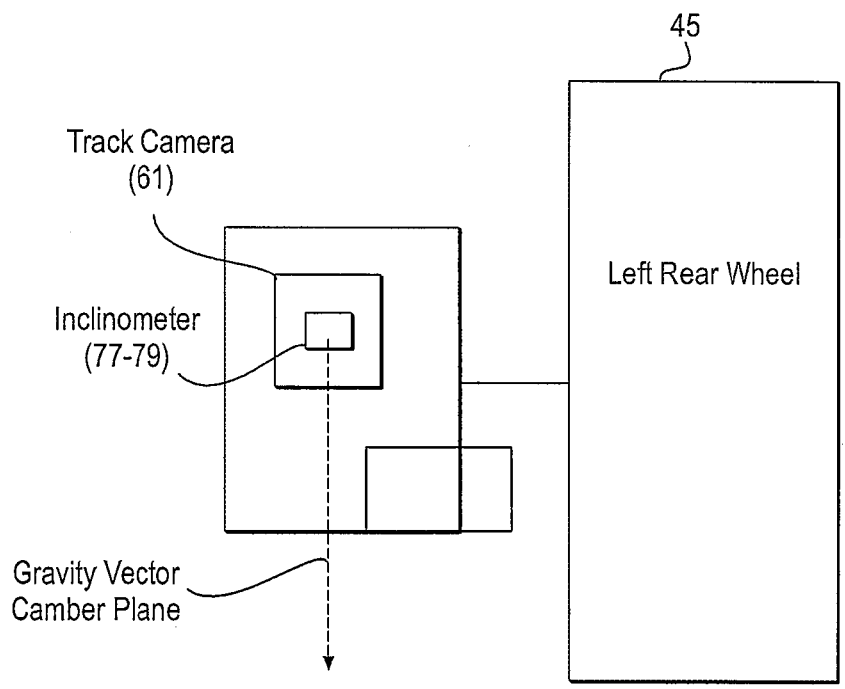
FIG. 5 is a rear view of one of the active sensing heads useful in explaining the relationship of the camera to the camber plane of the measured gravity vector.

FIGS. 4 and 5 are somewhat stylized illustrations of the active sensing head 55, in side and rear views, which illustrate the relationship of the axes measured by the tilt sensors to the other elements. It is assumed for discussion here that the tilt sensors 77-79 are elements of a single MEMS inclinometer. The inclinometer determines the gravity vector with respect to the pitch plane (FIG. 4) and the gravity vector with respect to the camber plane (FIG. 5). Similar measurements, of course, are taken for the other active sensing head 57 (FIG. 2). In this way, each head's orientation to gravity can be processed to relate each track facing camera's optical axis to gravity (FIGS. 4 and 5). In this way, the relationship of each front target to gravity can also be measured by processing of the image data and the gravity vector data.

Figure 6:
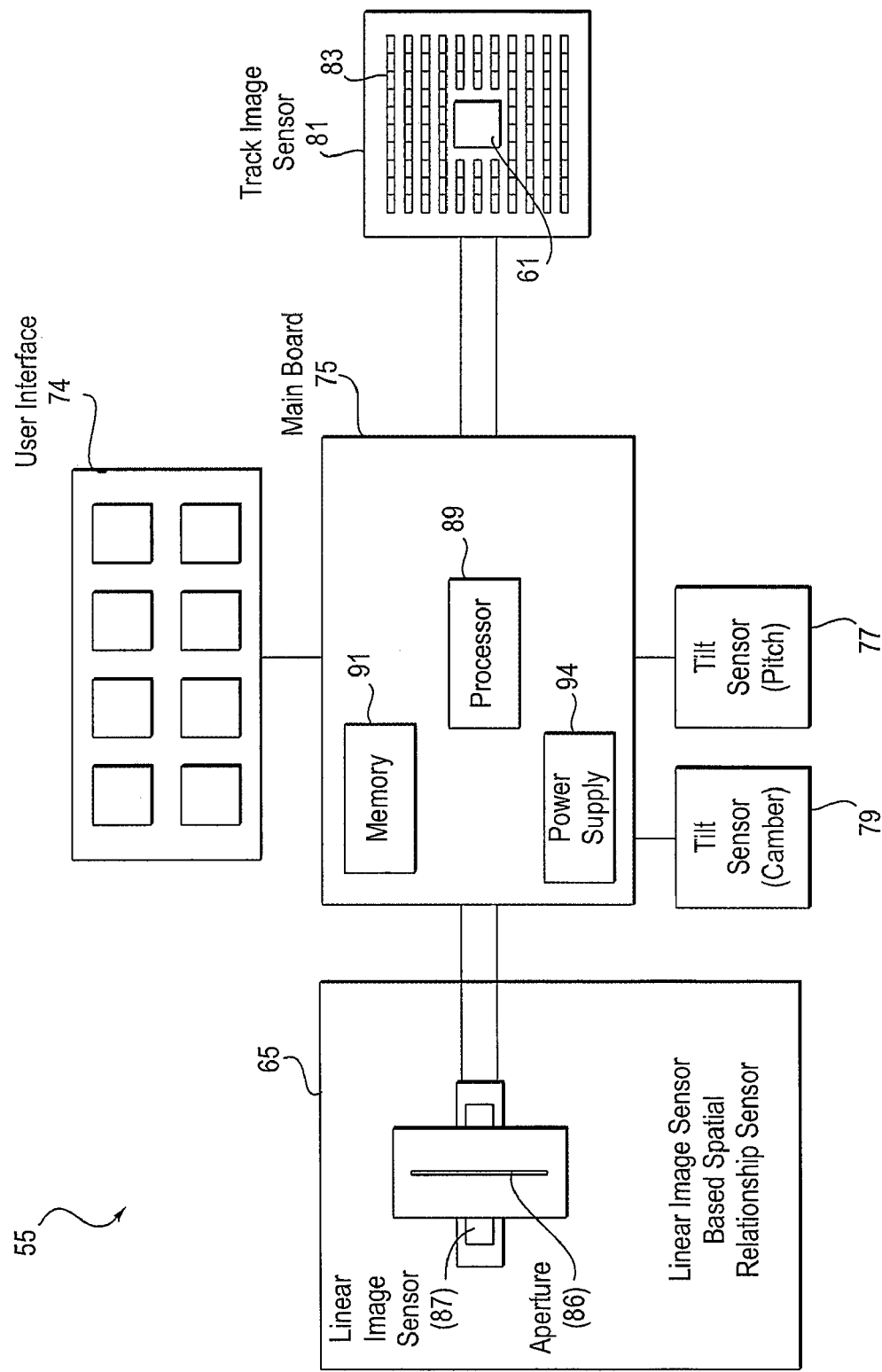
FIG. 6 is a functional block diagram of the components of one of the exemplary active sensing heads.

FIG. 6 is a functional block diagram of the elements of one of the active sensing heads, in this case the head 55, although the elements of the head 57 will be generally similar in this first example.

As discussed above, the active sensing head 55 includes an image sensing module 81 or the like containing an image sensor in the form of the track camera 61 which in use will face forward along the track of the left wheels to allow that camera to obtain images containing the target of the passive head 51 (see also FIG. 2). The track facing image sensor module 81, illustrated in FIG. 6, includes an LED array 83, serving as an illuminator, to emit light for desired illumination of the target on the head 51 mounted to the vehicle wheel 41 on the same side of the vehicle. The camera 61 is a digital camera that senses the image for the wheel alignment application. In operation, the camera 61 generates a value of each image pixel based on analog intensity of the sensed light at the point in the image corresponding to the pixel. The value is digitized and read out to circuitry on the main printed circuit board 75. The value may be digitized either on or off of the camera sensor chip.

In this implementation, the spatial relationship sensor module 65 comprises an aperture 86 and a linear image sensor 87 such as a charge-coupled device (CCD) or CMOS unit. An IR LED is provided to project a beam of light toward a similar toe sensor module in the opposite head 57. In a similar manner, the opposite head 57 includes an IR LED that projects a beam of light toward head 55.

The IR light/radiation from the IR LED of the opposing head 57 is sensed by the linear image sensor 87, via the aperture 86. The precise point on the sensor 87 at which the IR light from the other head is detected indicates the relative angle of incidence of the light from the opposite head at the sensor 87 in the head 55. In a similar fashion, the IR light/radiation from the IR LED of the head 55 is sensed by the linear image sensor, via the aperture in the opposite head 57; the precise point on the opposite linear image sensor at which the IR light from the LED is detected indicates the relative angle of incidence of the light from the head 55 at the linear sensor in head 57. Processing of the angle detection data from the two linear sensors enables determination of the angular relationship between the optical camera axes of the cameras 61 and 63 in the two active sensing heads.

The circuit board 75 includes a data processor 89 and an associated data/program memory 91. The data processor 89 may be implemented as a single chip or a set of individually packaged chips. In operation, each camera 61, 63 supplies digital image data to the data processor 89. As shown, the active sensing head 55 also includes the camber tilt sensor 79 and the pitch tilt sensor 77. These inclinometer elements supply the gravity angle measurements (see discussion of FIGS. 4 and 5) to the processor 89. The processor 89 performs one or more operations on the data and supplies the data for transmission to the host computer system 100.

The image processing operations of the data processor 89 may involve formatting various data for communication. Alternatively, the processor 89 may implement some degree of pre-processing before transmission to the host computer system 100. With regard to the image data, image pre-processing may include gradient computation, background subtraction and/or run-length encoding or other data compression (see e.g. U.S. Pat. No. 6,871,409 by Robb et al.). The processor 89 may also process the image data to some degree in response to the tilt data from the tilt sensors 77, 79 and/or the spatial relationship measurement data. Alternatively, the tilt and cross position data may simply be forwarded to the host computer for use in further processing of the image data.

The processor 89 in one of the active heads may be configured to receive data from the other head and perform wheel alignment parameter computations, internally, and then send only the vehicle measurement results to the host computer system 100. Moreover, processor 89 in one of the active heads may be configured to calculate all alignment values and also generate the user interface. In this case, the active head may act as a web server to serve web pages that implement the user interface for the wheel alignment system, and the host computer may consist of any general purpose computer with a web browser and no wheel alignment specific software.

The processor 89 or another controller (not separately shown) on the board 75 also provides control over operations of the active sensing head 55. For example, the control element (processor 89 or other controller) will control the timing and intensity of emissions by the LED array 83 and the IR LED as well as the timing and possibly other operational parameters of the camera 81 and the linear image sensor 87. The control element may perform power management to selectively shut down or reduce power supplies to different elements or modules of the sensing head, in response to occurrence of prescribed events or inactivity of sensing heads, to reduce power consumption and to extend operation time. Details of the power management of sensing heads will be described shortly. The active sensing head 55 also includes a user interface 74 for communicating with a user, and the processor 89 or other controller will sense and respond to inputs via the user interface 74.

Two-way data communications are provided between the components of the active sensing head 55 and the host computer 100 (FIG. 2) and in some configurations between the active heads, conforming to one or more appropriate data protocol standards, to enable data communication to and from the host computer 100 at desired speeds and in a wireless manner. Those skilled in the art will recognize that other data communications interfaces may be used in wheel alignment systems, such as WIFI or wireless Ethernet, Zigbee, Bluetooth, UWB (Ultra-Wideband), IrDA, or any other suitable narrowband or broadband data communication technology.

Electronic circuits on board 75 as well as elements of image sensing module 81 and spatial relationship sensor module 65 receive power from a supply 94. If heads 55 and 57 are wireless, the power supply may utilize power storage media, such as rechargeable or disposable batteries, or supercapacitors. If needed, the system 50 may use cables, to supply power and transmit signals to and from the heads 55 and 57, in case the wireless transmission is not working properly or power storage midis run out of power. The wired supply may run from a conventional AC power grid or receive power over USB or Ethernet cabling.

Returning to FIG. 2, host computer system 100 processes data from the active sensing heads 55, 57 and provides the user interface for the system 50. In the example, the system 100 may be implemented by a desktop type personal computer (PC) or other computer device such as a notebook computer, UMPC (ultra mobile PC), or similar device. A client server arrangement also could be used, in which case the server would perform the host processing and one of the active heads or another user device would act as a client to provide the user interface. Although those skilled in advanced wheel alignment technologies will be familiar with the components, programming and operation of various suitable computer systems, it may help to provide a brief example.

Computer system 100 includes a central processing unit (CPU) 101 and associated elements for providing a user interface. The CPU section 101 includes a bus 102 or other communication mechanism for communicating information, and a processor 104 coupled with the bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions. Although only one is shown, many computer systems include two or more storage devices 110.

The illustrated embodiment of the computer system 100 also provides a local user interface, for example, so that the system appears as a personal computer or workstation as might be used in a wheel alignment bay or an auto service shop. The computer system 100 may be coupled via bus 102 to a display 112, such as a cathode ray tube (CRT) or flat panel display, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104, which the CPU 101 in turn uses for controlling cursor movement on display 112. The cursor input device 116 typically has two degrees of freedom in two axes, a first axis (e.g., x) and a second axis (e.g., y), that allows the device to specify positions in a plane. The couplings between the user interface elements 112-116 and the CPU 101 may be wired or may use optical or radio frequency wireless communication technologies.

The CPU 101 also includes one or more input/output interfaces for communications, shown by way of example as an interface 118 for two-way data communications with the active sensing heads 55 and 57. For purpose of the wheel alignment application, the interface 118 enables the CPU to receive image data, spatial relationship measurement data and tilt data from the active sensing heads 55 and 57. Typically, the interface 118 also allows the host computer system 100 to send operational commands and possibly software downloads to the active sensing heads 55 and 57.

Although not shown another communication interface may provide communication via a network, if desired. Such an additional interface may be a modem, an Ethernet card or any other appropriate data communications device. The physical links to and from the additional communication interface(s) may be optical, wired, or wireless.

Although the computer 100 may serve other purposes in the shop, the alignment system 50 uses the computer system 100 for processing data from the heads 55, 57 to derive desired alignment measurements from the data provided by the heads, and to provide the user interface for the system 50. The computer system 100 typically runs a variety of applications programs and stores data, enabling one or more interactions via the user interface, provided through elements such as 112-116 to implement the desired processing. For wheel alignment applications, the programming will include appropriate code to process the data received from the particular implementation of the heads 55, 57, including computations to derive desired vehicle wheel alignment measurement parameters from the various data from the heads 55 and 57. The host computer 100 will typically run a general purpose operating system and an application or shell specifically adapted to perform the alignment related data processing and provide the user interface for input and output of desired information for alignment measurements and related services. Since it is a general purpose system, the system 100 may run any one or more of a wide range of other desirable application programs.

The components contained in the computer system 100 are those typically found in general purpose computer systems used as servers, workstations, personal computers, network terminals, and the like. In fact, these components are intended to represent a broad category of such computer components that are well known in the art.

At various times, the relevant programming for the wheel alignment application may reside on one or more of several different media. For example, some or all of the programming may be stored on a hard disk or other type of storage device 110 and loaded into the Main Memory 106 in the CPU 101 for execution by the processor 104. The programming also may reside on or be transported by other media for uploading into the system 100, to essentially install and/or upgrade the programming thereof. Hence, at different times all or portions of the executable code or data for any or all of the software elements may reside in physical media or be carried by electromagnetic media or be transported via a variety of different media to program the particular system and/or the electronics of the active sensing heads 55, 57. As used herein, terms such as computer or machine "readable medium" therefore refer to any medium that participates in providing instructions to a processor for execution. Such a medium may take many forms, including but not limited to, non-volatile media, volatile media, and transmission media (e.g. wires, fibers or the like) as well as signals of various types that may carry data or instructions between systems or between system components.

Runout compensation for the heads could be performed as with traditional conventional alignment heads by elevating the rear wheels and using the camber sensors to measure the runout vector then elevating the front wheels and using cameras to image the targets as they rotate about the front wheel's axis. An alternate method would be to avoid elevating the wheels by rolling the vehicle along the lift and performing the runout measurements on the heads with the inclinometers as the track cameras image the front targets as well as fixed targets on the lift, vehicle or other stationary object in order to establish the fixed coordinate system.

As noted, the rear heads 55, 57 incorporate inclinometer type tilt sensors to measure the relative camber and pitch angles of each rear head to gravity. Once runout is taken and the inclinometer angle values are measured, each head's orientation to gravity could be processed to relate each track facing camera's optical axis to gravity. Using the relationship of the track facing camera to gravity and the measured relationship of the front target to the track facing camera, the relationship of the front target to gravity can be calculated. A spatial relationship is measured by the sensors 65 and 67, to determine the spatial relationship between the track cameras 61 and 63.

Front toe, caster, and SAI would be measured using techniques similar to those embodied in an imaging aligner, such as the Visualiner 3D or "V3D" aligner, available from John Bean Company, Conway, Ark., a division of Snap-on Incorporated. The rear thrust angle, each rear individual toe, and the horizontal angular relationship of the track cameras to each other, would be derived from the measurements obtained by the rear spatial relationship sensors. The inclinometers would relate each track camera to each other through the common gravity vector references. With the track cameras effectively related to each other along the axis of the rear thrust line, each front target's location and orientation can be determined in a coordinate system that is directly related to the thrust angle and to gravity.

Calibration may be performed by mounting each rear head on a straight calibration bar in much the same way that the current conventional heads are calibrated. The bar is first rotated to compensate for runout. The zero offset of the rear spatial relationship sensors can then be set and by leveling the calibration bar, each camber sensor zero offset can be set. The pitch zero offset is set by leveling the head with a precision level bubble and recording the pitch inclinometer value. Enhanced camera calibration may be achieved by adding another calibration bar adapted to mount the front targets in view of the track cameras (see e.g. U.S. Patent Application Publication No. 2004/0244463 by James Dale, Jr.). After the initial calibration above is performed, the track cameras measure the orientation of the front targets as the targets and bar are rotated about the axis of the front calibration bar. The relationship of one camera to the other may be calculated and thus the relationship of each camera to the rear spatial relationship checked or calibrated. By leveling the front target calibration bar, the fixed relationship of each track camera to the local inclinometers may also be checked. This redundant check could possibly constitute an ISO check for customers that require measurement accuracy traceability.

In addition, small targets may be affixed to each front turntable allowing for an additional measurement or cross check of turn angle.

It will be readily apparent to someone skilled in the art that the wheel alignment systems discussed herein may be implemented with various different types of spatial relationship sensors. An image sensor is one type of spatial relationship sensor. An image sensor may consist of a camera with a two dimensional array of sensing elements that produces data representative of an image expected to contain a target within the field of view of the sensor. The data from the image sensor can be processed to determine position and orientation information related to the viewed target and thus the head, wheel or other object with which the target is associated. An example of a prior art image sensor is the camera used in the Visualiner 3D commercially available from John Bean Company, Conway, Ark., a division of Snap-on Incorporated. An angle sensor is another type of applicable spatial relationship sensor. An angle sensor produces data representing the angle from the sensor relative to a point. Various types of angle sensors are generally known. One example of an angle sensor is the linear CCD sensor as used in the Visualiner available from John Bean Company.

Figure 7:
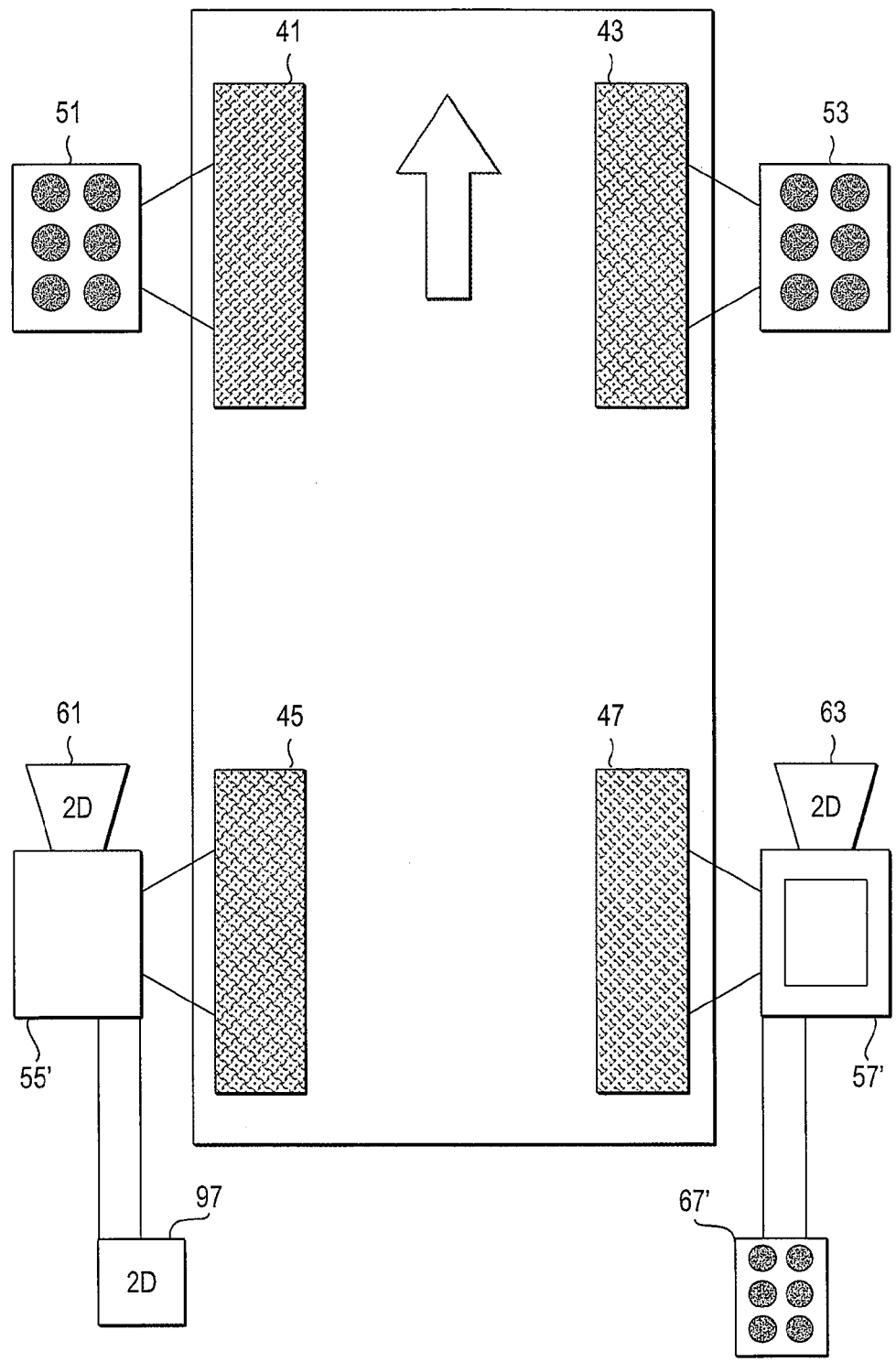
FIG. 7 diagrammatically illustrates another arrangement of targets and active sensing heads in relation to vehicle wheels, in this case using additional targets and image sensing for measurement of the spatial relationship between the active heads.
Figure 8:
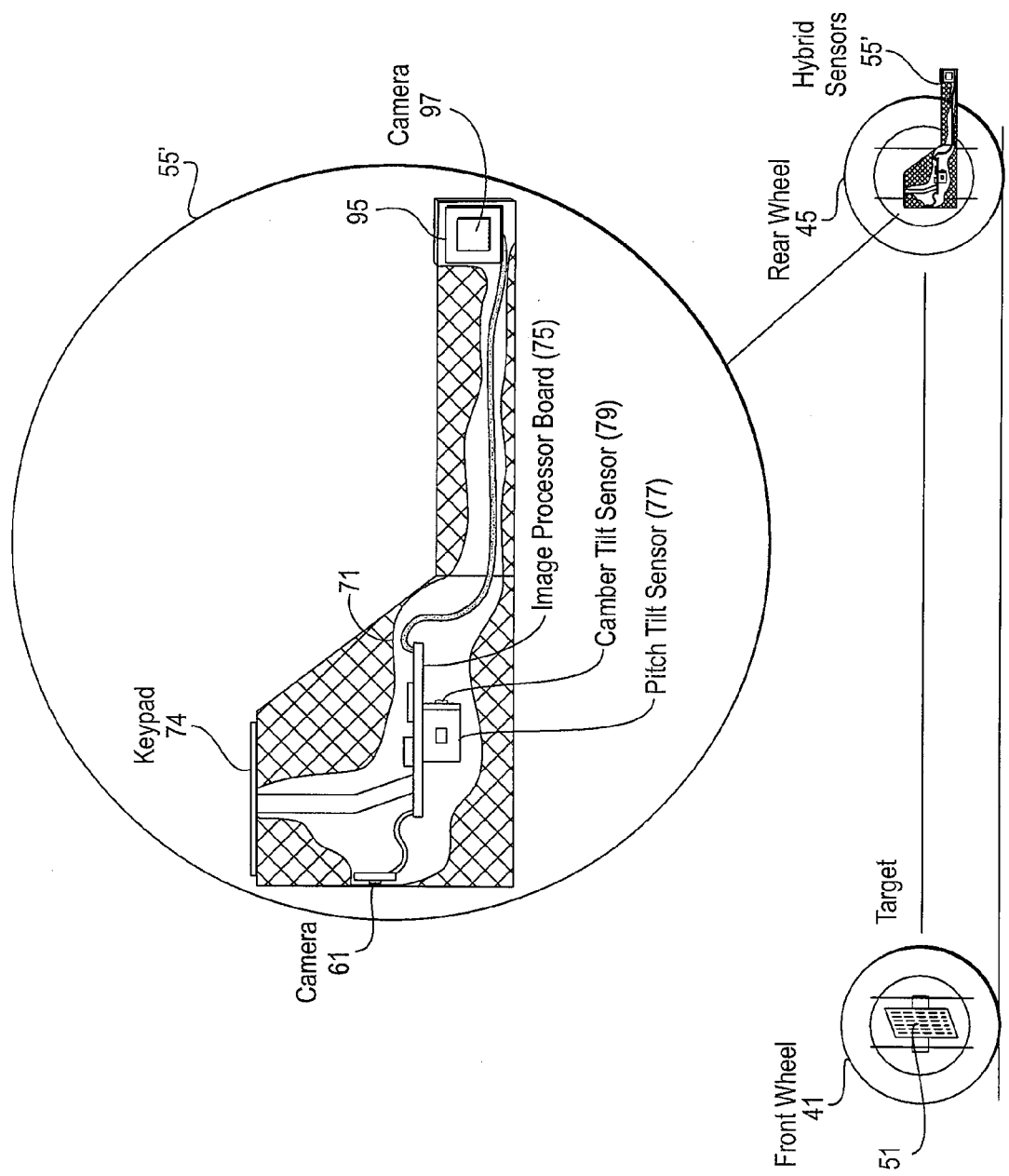
FIG. 8 is a side view of some of the wheel mounted components of the system of FIG. 7, with one of the active sensing heads shown in a partial cross-sectional detail view, generally like that of FIG. 3; but wherein the spatial relationship sensor utilizes another camera.
Figure 9:
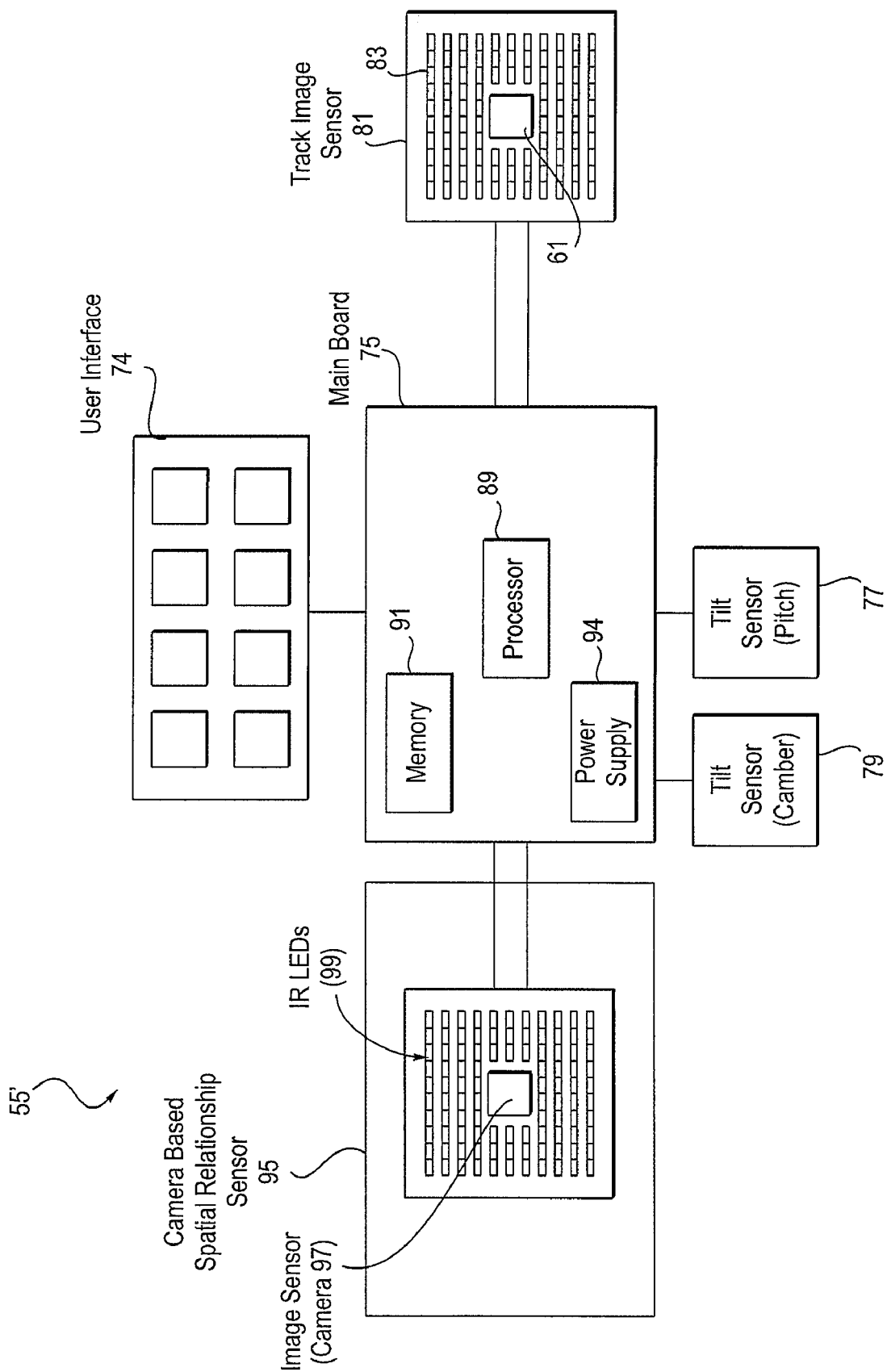
FIG. 9 is a functional block diagram of the components of an exemplary active sensing heads shown in the detail view in FIG. 7.

Hence, it may be helpful now to consider an example in which the aperture and linear image sensor style spatial relationship sensing arrangement described above relative to FIGS. 3 and 6 is replaced by an imaging type camera similar to the track camera. FIGS. 7 to 9 are views/diagrams similar to those of FIGS. 1, 3 and 6, except that the illustrations of this second implementation show such an alternate technology using a target and image sensor for the spatial relationship sensing function. Wheels and elements similar to those of the implementation of FIGS. 1, 3 and 6 are similarly numbered and are constructed and operate in essentially the same fashion as discussed above. This example uses passive two-dimensional targets 51 and 53 on the front wheels 41 and 43; and it uses active heads 55' and 57' on the rear wheels for the measurements alongside the vehicle tracks, much as in the example of FIG. 1. The rear active sensing heads use cameras 61, 63 or similar 2D image sensors to obtain images of the targets on the front heads 51, 53 and determine the relative positions and orientations of the targets with respect to the active heads, as discussed in detail above relative to FIG. 2. However, the spatial relationship of the two active heads 55', 57' is determined by at least one 2D image sensor 97, which obtains images of a 2D target 67' mounted on the opposite active head. In this example, the active head 57' has an associated target 67' similar to one of the targets on head 51 and 53, but the head 57' does not include a sensor for the spatial relationship measurement function. The active sensing head 55' uses an image processing type approach to the spatial relationship measurement across the rear of the vehicle based on imaging the target 67'. The image sensor 97 typically would be similar to the cameras or the like used as 2D image sensors in the example of FIG. 2.

As shown in more detail in FIGS. 8 and 9, the spatial relationship sensor 95 uses an image sensing module similar to the track facing image sensor module 81. The spatial relationship image sensing module 95 includes a digital camera 97 and an LED array 99. The LED array 99 serves as an illuminator. For the spatial relationship sensing application, the LED array 99 produces infrared (IR) illumination. The other rear head 57' includes an IR sensitive retro-reflective target 67' (FIG. 7) to be illuminated by the LED array 99, which in turn is sensed by the camera 97.

The spatial relationship camera 97 images the target 67' positioned on the companion head (across the rear of the vehicle) in place of the other spatial relationship sensor. Both cameras 61 and 97 could share a common processing board in the one head while the other head may simply use a single camera (for track) and a target (for cross). Processing of the target image obtained by camera 97 can compute the angular spatial relationship between the rear heads, in much the same way as the images from the active head cameras were processed to determine relative angle and/or position of the wheel mounted targets in the examples of FIGS. 1 and 2. Rather than measuring a spatial relationship angle as in the previous example, the image sensing module and associated image processing measures the 3D spatial relationship of the target on the opposite active head. For additional information regarding measurement based on processing of images of targets, attention again is directed to U.S. Pat. No. 5,724,743 to Jackson.

In the system of FIGS. 7 to 9, at least one active head contains gravity sensors to measure camber and pitch of the head. Since the imaging of the target mounted on the opposite active head allows the system to obtain a three-dimensional (3D) spatial relationship measurement between the two active heads, only one active head is required to have gravity sensors. Otherwise, the structure, operation and computations are generally similar to those of the earlier examples.

In the examples discussed above, the active heads have been associated with the rear wheels, and the targets have been associated with the front wheels of the vehicle. However, those skilled in the art will understand that there are many variations of the basic configurations discussed above. Also, there are a variety of different combinations of imaging sensors with other sensors for determining the spatial relationship that may be used. Several are described and shown below.

Figure 10:
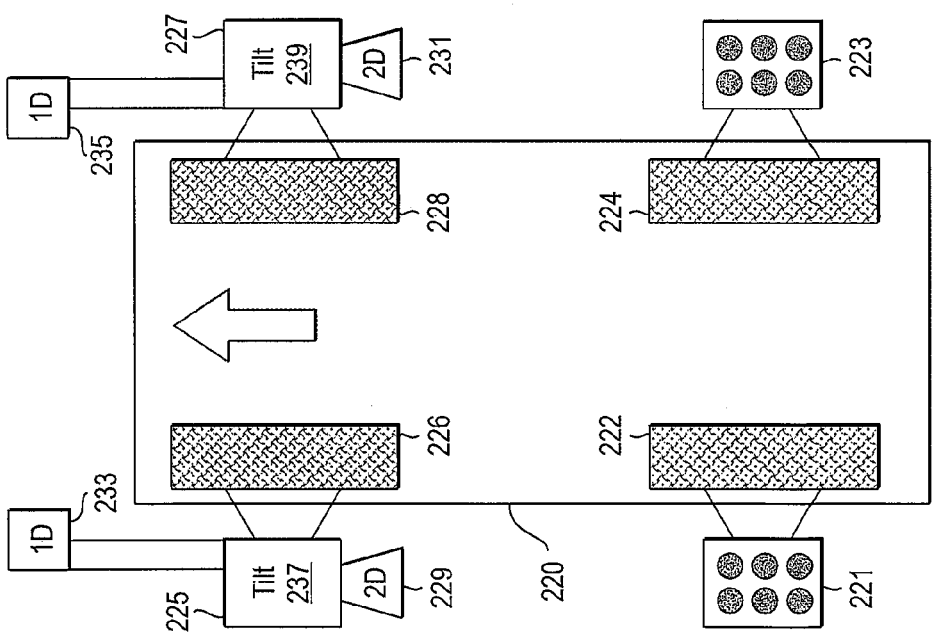

FIG. 10, for example, shows an arrangement similar to that of FIG. 1 in which the active heads and the target heads are reversed. The wheel alignment system of FIG. 10 includes a pair of passive heads 221 and 223 mounted on respective wheels 222 and 224 of the vehicle 220, which are rear wheels in this example. The active sensing heads 225 and 227 are adapted for mounting in association with the respective front wheels 226 and 228 of the vehicle 220. Again, each active sensing head includes an image sensor 229 or 231 for producing image data, which is expected to include an image of a passive target when the various heads are mounted to the respective wheels of the vehicle. In this example, the image sensors 229 and 231 in the active sensing heads 225 and 227 are two dimensional (2D) imaging devices, e.g. cameras similar to the track cameras in the earlier examples.

The heads 221 and 223 are passive in that they include targets of a type that may be observed by one of the image sensors in the active heads 225 and 227, but they do not include any sensing elements. Typically, the targets comprise light and dark regions that can be detected when illuminated by other sources and imaged by cameras or the like in the active sensing heads 225 and 227.

As in the earlier examples, the system also includes a spatial relationship sensor associated with at least one of the active sensing heads 225 or 227. The spatial relationship sensor enables measurement of the spatial relationship between the active sensing heads 225 and 227 when the active sensing heads are mounted on wheels of the vehicle. In this example, the system uses two conventional (1D) angle sensors 333 and 335 to measure the relative angles of the active sensing heads 225 and 227, in the toe plane. The active heads 225 and 227 also contain gravity sensors or the like to measure tilt, typically camber and pitch, of the head. Hence, the head 225 includes one or more tilt sensors 337; and the head 227 includes one or more tilt sensor 339.

As shown in the earlier examples (e.g. FIG. 2), the system also includes a computer. The computer processes image data relating to observation of the targets and tilt data, from the active sensing heads. The computer also processes spatial relationship data from the at least one spatial relationship sensor. The data processing enables computation of at least one measurement of the vehicle.

As noted, this example is essentially a front-to-rear reversal of the target/active sensing head positions from that of the example of FIG. 1. Although not all variants are shown, those skilled in the art will understand that similar types of front-to-rear variants and/or left-to-right variants can also be implemented for every other alternative arrangement discussed herein.

Figure 11:
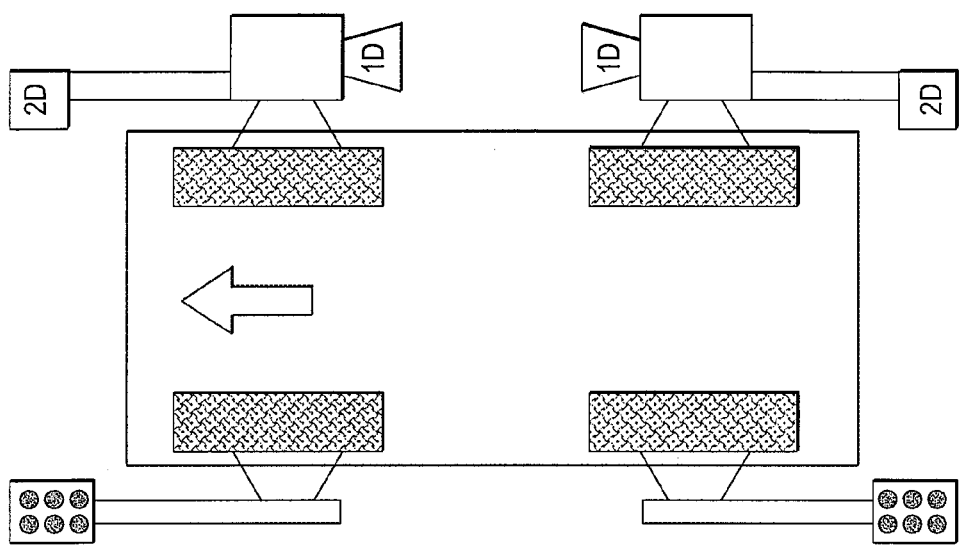
FIGS. 10 to 18 diagrammatically illustrate a series of alternative arrangements, having various heads/targets associated with different combinations of the vehicle wheels and using various different configurations or equipment for spatial relationship sensing.

FIG. 11 illustrates another alternative arrangement. In this example, two active sensing heads are mounted on one side of the vehicle, and two passive sensors are mounted on the opposite side of the vehicle. As shown, the mounting of the targets on the passive heads provides an extension out away from the wheels, somewhat, so as to allow the image sensors in the active heads to see and image the targets. Each active head contains an image sensor that obtains images of a target attached to the corresponding wheel on the opposite side of the vehicle. As in the earlier examples, each active head contains gravity sensors to measure camber and pitch of the head. Here, the spatial relationships of the two active heads are determined by two conventional angle sensors measuring the toe plane angles between the two heads. Since the structure, operation and computations are generally similar to those of the earlier examples, those skilled in the art should understand the example of FIG. 11 without a more detailed discussion here.

Figures 12, 13, 14:
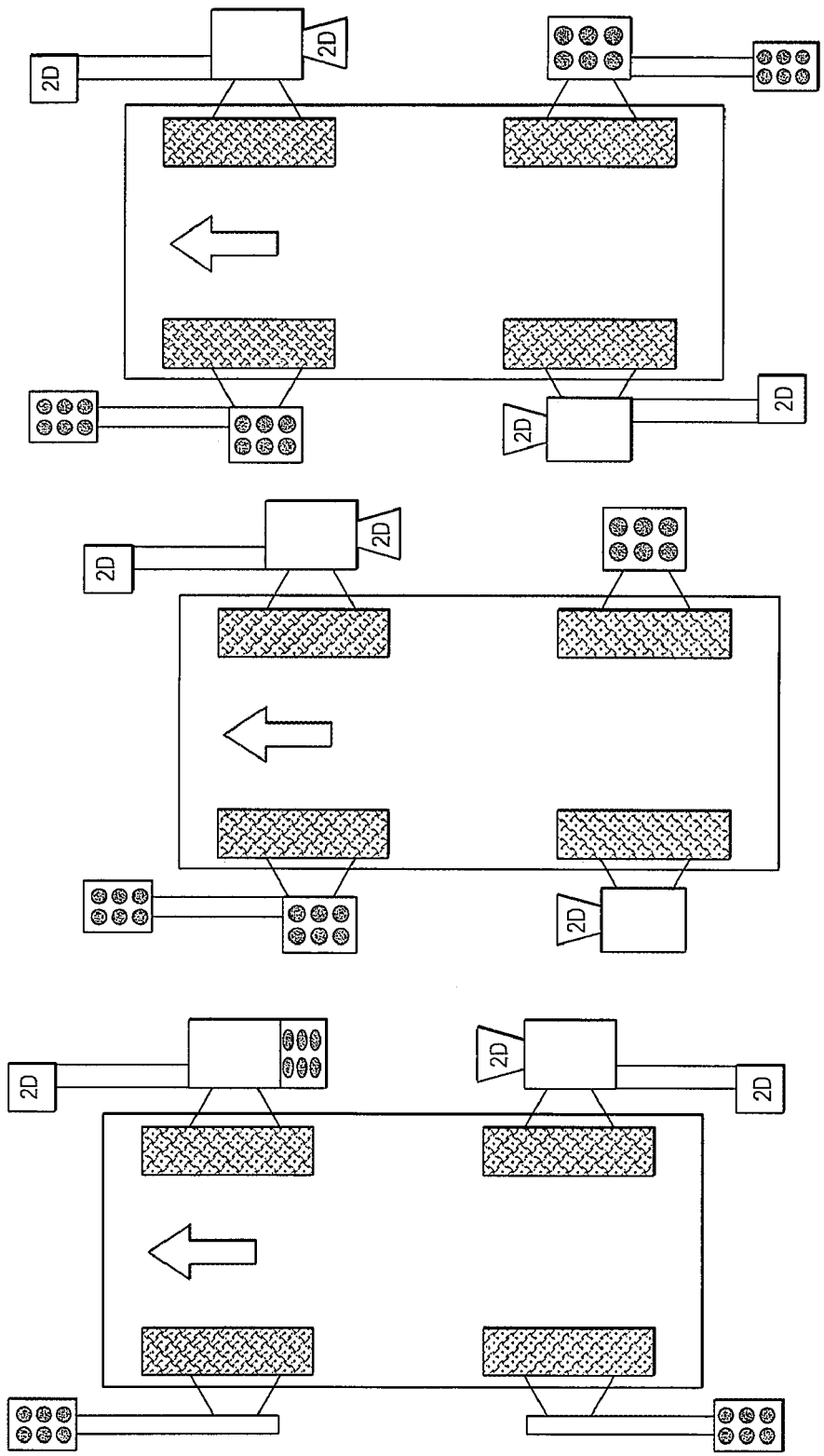

FIG. 12 illustrates another alternative arrangement. In this example, two active sensors are mounted on one side of the vehicle, and two passive sensors are mounted on the other side of the vehicle. Each active head contains image sensors that obtain images of targets attached to the corresponding wheel on the opposite side of the vehicle. Here, the spatial relationships of the two active heads are determined by one or more image sensors that obtain images of a target mounted on the opposite active head. In the example, the front active head includes a target, and the rear active head includes a 2D imaging sensor for obtaining images of that target, in a manner analogous to the 3D spatial relationship measurement in the example of FIGS. 7 to 9. At least one active head contains gravity sensors to measure camber and pitch of the head. Since this system obtains a 3D position and orientation measurement between the two active heads, only one active heads is required to have gravity sensors. Again, since the structure, operation and computations are generally similar to those of earlier examples, those skilled in the art should understand the example of FIG. 12 without a more detailed discussion here.

FIG. 13 is yet another alternative arrangement. This example uses a first active sensing head containing a single 2D image sensor for obtaining images of a passive target on a first passive head mounted on the other wheel on the same side of the vehicle. The first passive head is mounted to a wheel on the same side of the vehicle as the first active head. In the specific example shown in the drawing, the first active head is mounted on the left rear wheel, and the first passive head is mounted on the left front wheel. One target on the first passive head is available for imaging by the 2D image sensor associated with the left rear wheel, that is to say, along the vehicle track on that side of the vehicle.

However, the first passive head also contains a second passive target in a known relative position with respect to its first passive target. The second passive target is extended in front of the wheel so that it can be viewed by a corresponding 2D image sensor on the opposite side of the vehicle, for imaging in a spatial relationship measurement. Hence, the second active head is mounted across from the first passive head, that is to say on the right front wheel in the illustrated arrangement. The second active head contains two 2D image sensors. One of these sensors obtains images of the target mounted on the first passive head, attached to the opposite (left front) wheel for the spatial relationship measurement. The other 2D image sensor in the second active head obtains images of the target mounted on a second passive head, which is mounted on the same side of the vehicle, that is to say, on the right rear wheel in this example. The second passive head contains a single target, and that head is mounted across from the first active head.

In the arrangement of FIG. 13, at least one of the active heads contains gravity sensors to measure camber and pitch of the head. Since the system obtains a 3D position and orientation measurement between the two active heads, only one active heads is required to have gravity sensors. In general, the details of implementation and operation of the system of FIG. 13 should be apparent from this summary discussion and the earlier detailed disclosure of the examples of FIGS. 1-9.

The example illustrated in FIG. 14 is generally, similar to the example of FIG. 13, except that in the system of FIG. 14, the first active head also contains a second image sensor. The second image sensor in that head obtains an image of a second target attached to the second passive head. This configuration has an advantage over the arrangement of FIG. 13 in that it only requires two unique head hardware configurations rather that four. Both active heads are the same, and both passive heads are the same. Each of the active heads would be similar to the head 55' shown in FIGS. 8 and 9. One active head should be identified as a front head and the other as a rear head. This can generally be done with firmware in the embedded processors.

A second advantage of this configuration (FIG. 14) is that the second spatial relationship measurement is redundant information that is not required to calculate wheel alignment. This redundant information can be used as a calibration check on the system. If both active heads contains gravity sensors, both camber and toe can be validated. If only one active head contains gravity sensors, only the toe calibration can be validated.

Figure 15:
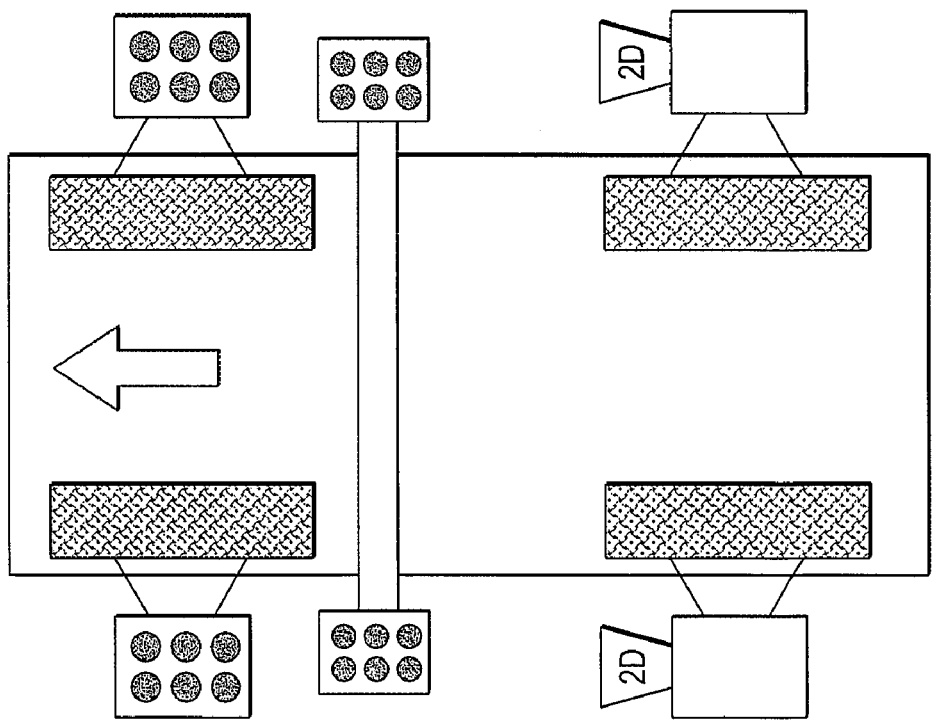

In the example shown in FIG. 15, the system uses passive heads with targets that are mounted on each of the front wheels, essentially as in the examples of FIGS. 1-9. Active heads, shown on the rear wheels, contain 2D image sensors. A reference bar with a target on each end is placed such that each active head can view one of the targets on the reference bar as well as the target on the front wheel of the same side of the vehicle. The relative positions and orientations of the two targets on the reference bar are known. The system can find the spatial relationship of the two active heads from the measured 3D positions and orientations of the two reference targets by the active heads and the known relationship of the two reference targets. This provides the spatial relationship information obtained by the spatial relationship sensor—target of the example of FIGS. 7 to 9. Since the reference targets are fixed in position they can also be used as a reference for measurements during rolling runout. Those skilled in the art should appreciate the detailed structure and operations of this example, from the drawing, this description and the earlier discussion of other similar examples.

Figure 16:
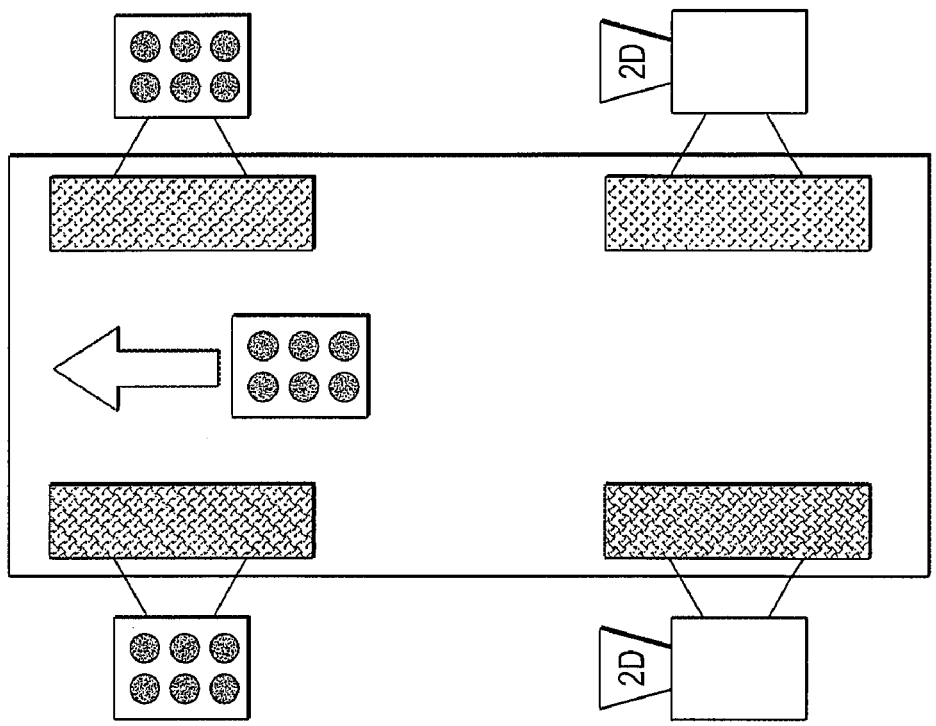

The example illustrated in FIG. 16 generally works just like the example of FIG. 15, except there is only a single reference target. The viewing angle of the image sensors in the active heads must be wide enough to be able to view both the passive head target on the same side of the vehicle and the single reference target.

Figure 17:
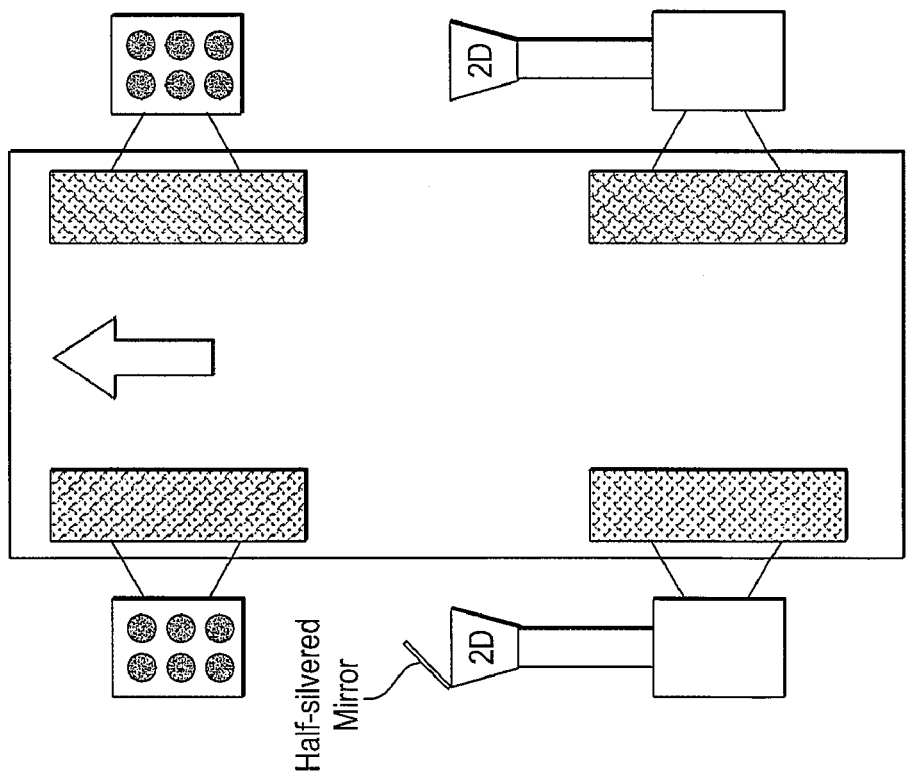

FIG. 17 illustrates yet another example of an exemplary wheel alignment system. Here, the system uses passive heads with attached targets mounted on each front wheel. The active heads are mounted on the rear wheels, as in several of the earlier examples. Each active head contains a 2D image sensor to obtain images of the passive head target on the respective side of the vehicle.

The image sensors are extended forward from the center of the rear wheels so that the sensors are located forward of the rear wheel tires, so as to provide a cross-vehicle line of sight under the vehicle. One of the image sensors, in the example the sensor on the active head mounted on the left rear wheel, contains a partial mirror that passes images from the passive target or reflects images from a target mounted on the corresponding active head on the other side of the vehicle. The operations of the mirror are shown in more detail in FIG. 19.

Light from the passive target on the passive head mounted on the same side of the vehicle, that is to say, on the left front wheel in the illustrated arrangement, passes directly through the half-silvered mirror to the 2D image sensor on the active sensing head mounted on the left rear wheel. Light from the passive target on the opposite active head, that is to say on the active head mounted on the right rear wheel in the illustrated arrangement, arrives at an angle to the partially reflective side of the mirror and is reflected into the 2D image sensor on the active sensing head mounted on the left rear wheel. The advantage of this system is that it eliminates one image sensor by allowing one of the sensors to view two different targets.

For further details of exemplary arrangements and combinations of alignment cameras and targets, attention is directed to a co-pending patent application Ser. No. 11/487,964, titled "VEHICLE WHEEL ALIGNMENT SYSTEM AND METHODOLOGY," commonly assigned to the assignee of this application, the disclosure of which is incorporated herein by reference in its entirety.

Figure 19:
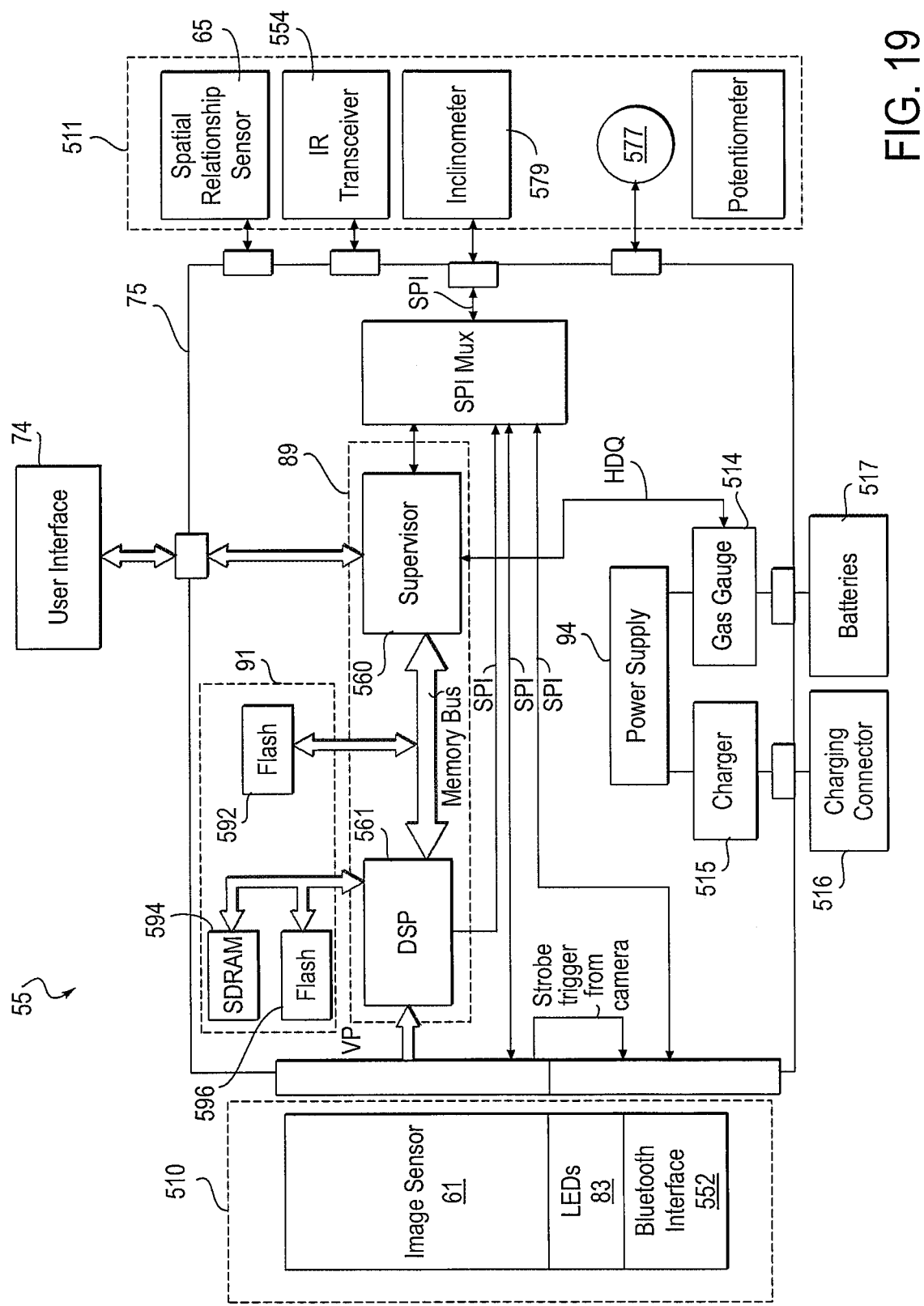
FIG. 19 shows a detailed functional block diagram of an exemplary sensing head.

FIG. 19 is a detailed functional block diagram showing an exemplary sensing head implemented with highly reliable, fault tolerant features. For purpose of explanation, detailed operations are discussed based on the structure of the sensing head 55 shown in FIGS. 2 and 6. However, it will be readily apparent to someone skilled in the art that the power management discussed herein may be implemented with various different types of sensing heads or alignment systems including those disclosed herein as well as other variations, such as image or non-image based wheel alignment systems using sensors or heads remote or attached to the wheels of a vehicle to measure various angles of the wheels and suspension.

The exemplary sensing head 55 includes a circuit board 75 and a user interface 74 for communicating with a user. The user interface 74 includes input and/or output devices such as keypad, control buttons, switches, display, touch screen input, voice recognition, LEDs, speakers, etc. As previously discussed relative to FIG. 6, the printed circuit board 75 includes a data processor 89, a memory device 91 and a power supply 94. The circuit board 75 couples to one or more peripheral devices 510, 511. Each peripheral device includes one or more functional modules for performing respective designated functions useful in obtaining data usable in calculations of alignment measurements. The functions may include wireless communications, detection of spatial relationships relative to other sensing heads, illuminations, image capturing, detection of spatial characteristics of wheels or alignment heads, user interface, self-diagnosis, self testing, power supply, power management, signal processing, etc.

For instance, the peripheral device 510 includes a camera module 61 implemented with image sensors, such as a charge-coupled device (CCD) or CMOS unit; an LED array module 83, serving as an illuminator, to emit light for desired illumination of the target mounted to the vehicle wheel on the same side of the vehicle; and a wireless communication module 552 comport to Bluetooth standard to perform wireless communications with host computer system 100. The peripheral device 511 includes a spatial relationship sensor module 65 using a beam angle detection technology, discussed previously with regard to FIG. 6, to detect relative spatial relationships between the active sensing heads 55 and 57; a tilt sensor module 579 implemented with a MEMS type inclinometer for measuring camber and sensing device pitch; a potentiometer module 577 implemented with a rotary potentiometer to encode the angle of the shaft of the sensing device 55 relative to the wheel/wheel clamp assembly; and an IR transceiver module 554 for forming a communication path for sending and receiving measurements data to sensing head 57, as discussed with regard to FIG. 2.

While the functional modules illustrated in FIG. 19 are described based on the sensing head shown in FIGS. 2 and 6, it is known to people skilled in the art that the selection and combination of functional modules and peripheral devices are not limited to those shown in FIGS. 9 and 19. Rather, various types or different combinations of peripheral devices and/or functional modules may be used to implement different types of sensing heads with different functions.

In one embodiment, one or more functional modules or components of the sensing head or alignment system implement self-testing and/or self-diagnosis functions. Operation status and health condition of each of the functional modules or components are determined and communicated to the data processor 89 for determining an overall health of the sensing head or the alignment system. Generally, any detected problems will be reported the host computer system 100 and communicated to the user on a display of the system host and/or the user interface 74 on the sensing head 55, such as via a simple LED indicators or a small graphics or alphanumeric display panel. The communication using the user interface 74 on the sensing head 55 is useful in the event that all communications between the sensing head 55 and the host computer system 100 fail.

According to another embodiment, an individual failed module or component can be switched off if a fault in the module or component is detected. This prevents a failed device or module from negatively affecting the performance of other modules or components. Features associated with the failed module or component may not be available, but the remainder of the sensing head or system will continue to operate with its capability reduced by only the features of the failed component or module. In another embodiment, an exemplary sensing head and/or alignment system is implemented with redundant system resources and/or alternative operation modes such that the alignment or system is capable of continued operation despite an occurrence of a single point failure. For instance, multiple sets of a selected device, such as illumination LEDs, may be provided. Each set of LEDs can work independently for illumination of targets even if another set or sets of illumination LEDs are not operating, existent, or performing properly. Details of designs, techniques, control and operations related to testing, self diagnosis, redundant resources will be described shortly.

(1) The Data Processor

The data processor 89 includes a supervisor processor 560 and a DSP controller 561. The supervisor processor 560 handles system management tasks, such as power management, fault determination, data communications, system integrity and user interface, and coordinates operations of the functional modules and various components of the sensing head 55. The supervisor processor 560 utilizes Host Port Interface (HPI) to communicate with the DSP controller 561. Each module couples to the supervisor processor 560 using a Serial Peripheral Interface (SPI), via a SPI multiplexer. The SPI multiplexer is a programmable logic device (CPLD) designed to ensure the isolation of each SPI interface from other SPI interfaces and the supervisor processor 560. In this way, no one faulty module can cause signal contention and failure of the shared SPI interface to the supervisor processor 560. The supervisor processor 560 may be implemented using an ARM 9 microcontroller, available from Atmel Corporation of San Jose, Calif.

The DSP controller 561 executes firmware independent of the supervisor processor 560, and is in charge of processing image data received from the camera module 61 and deriving the target plane orientation. In one embodiment, the DSP controller 561 also determines image integrity when the self-test feature is invoked to have the image sensor generate a test image (details related to test images will be described below relative to the camera module 61). The DSP controller 561 may be implemented using a video/imaging processor TMS320DM642 from Texas Instruments Incorporated.

In another embodiment, the DSP controller 561 is configured to work as a backup master processor which takes over many tasks performed by the supervisor data processor 560 should the supervisor data processor 560 fail. The tasks may include wireless communications, interactions with the user interface 74, etc. For instance, the DSP controller 561 can take control of the sensing head 55 and send all failure data to the user by communications with the host computer system 100, the companion sensing head 57 and/or the user interface 46.

The DSP controller 561 learns an operation condition of the supervisor data processor 560 via one or more signal lines. For instance, the supervisor data processor 560 may send a heartbeat signal to the DSP controller 561 when the supervisor data processor 560 is working properly. If the supervisor data processor 560 fails, the heartbeat signal is gone and based on the absence of an effective heartbeat signal from the supervisor data processor 560, the DSP controller 561 determines that the supervisor data processor 560 has failed, and predetermined steps for taking over part or all of the tasks that previously performed by the supervisor data processor 560 are performed by the DSP controller 561. In another embodiment, the supervisor data processor 560 constantly drives a specific signal line to a specific state, such as pull high, when the supervisor data processor 560 is working properly. If the state of the specific signal line is not pulled high, the DSP controller 561 determines that the supervisor data processor 560 is not working properly and will take over the tasks previously performed by the supervisor data processor 560.

(2) The Camera Module

The camera module 61 may be implemented with an Omnivision OV9121 image sensor with 1280×1024 pixel image resolution, available from Omnivision of Sunnyvale, Calif. The image sensor setup, exposure time, gain settings and image acquisition is controlled by an image controller (not shown), such as a Freescale MC9S08 microcontroller available from Freescale Semiconductor, Inc. of Austin, Tex. The image controller communicates with the supervisor processor 560 via the SPI communications bus. The supervisor processor 560 may command the camera module to take both a background frame (no illumination) followed immediately by an illuminated frame or simply one or the other types of frames. The image data obtained by the image sensor are coupled to a video port of the DSP controller 561, where images are acquired at predetermined rates, such as 24 or 48 MegaPixels/sec.

In one embodiment, the image controller also monitors various functions of the image sensor, temperature, image frame pixel count and power supply voltages to ensure proper operation of the camera module 61. Any failures or variances from nominal will be reported by the image controller to the supervisor processor 560 via the SPI interface. In another embodiment, the image sensor can be commanded by the image controller to generate an overlay test pattern.

The image controller may command the image sensor to generate an overlay test pattern, such as a color bar test pattern, associated with one or more captured images. The DSP controller 561 evaluates the functional integrity of image sensors in the camera module 61 based on image data including the test pattern. If an analysis of image data received from the image sensor reveals a normal test pattern and no defective target images (such as a dark image), the DSP controller 561 determines that the image sensor is working properly because the test pattern is generated and sensed as intended. In this case, the sensing head 55 has sufficient confidence and certainty that the dark image is caused by reasons other than malfunctions of the image sensor of the camera module. The actual cause may be insufficient light, non-existence or misplacement of alignment target, etc. On the other hand, if both the test pattern and an effective target image are unavailable, the DSP controller 561 determines that the image sensor in the camera module 61 failed. An appropriate error signal identifying the faulty image sensor may be generated and sent to the supervisor processor 561 and/or the user interface 74 for communicating to the user.

(3) The LED Array Module

Figure 20:
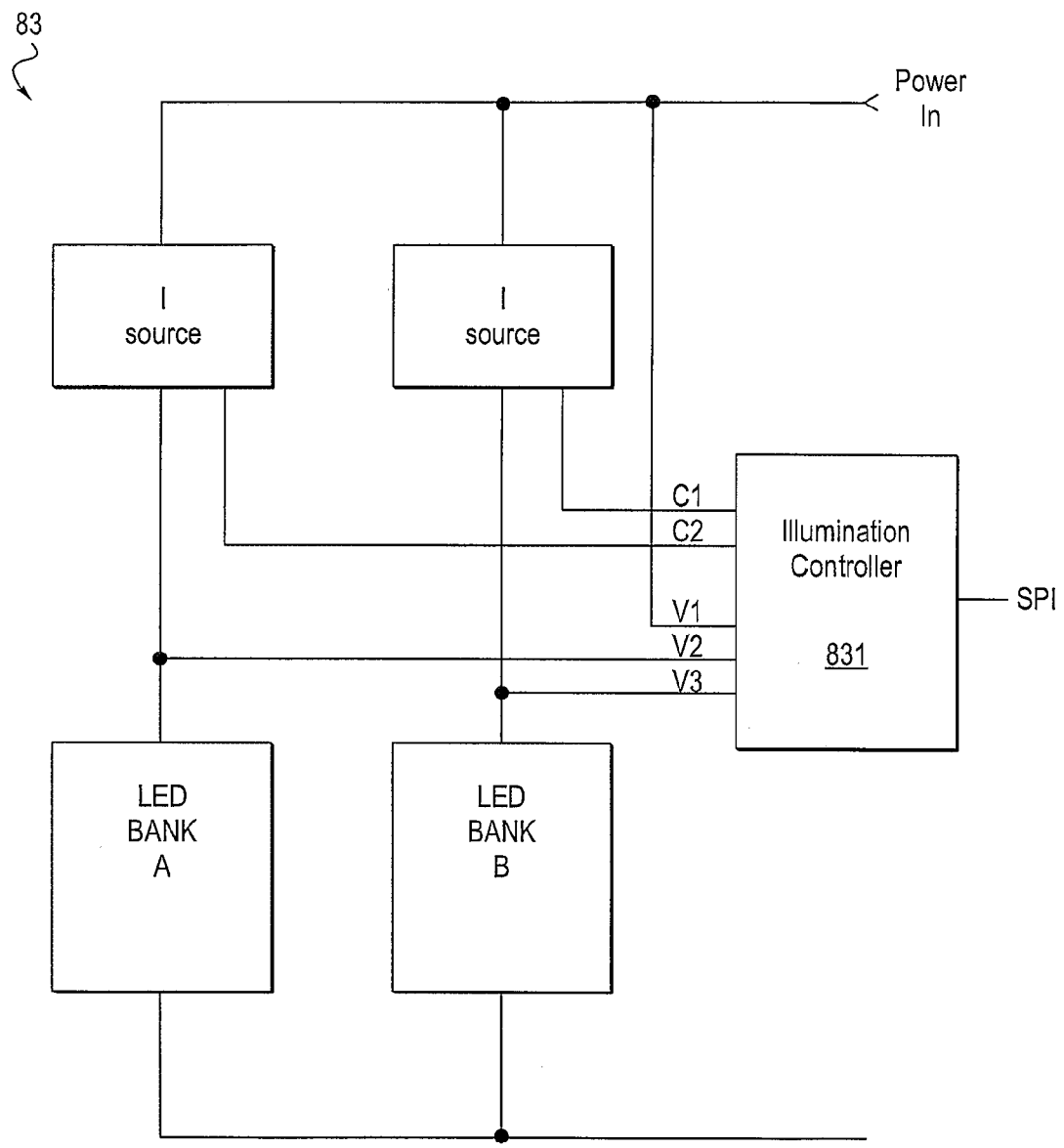
FIG. 20 is a simplified block diagram of an exemplary illumination module.

The LED array module 83 performs image illumination (strobe). FIG. 20 shows an exemplary circuit diagram of the LED array module 83. The LED array module 83 is controlled by an illumination controller 831, which may be implemented with a Freescale MC9S08 microcontroller, available also from Freescale Semiconductor, Inc. The illumination controller 831 communicates with the supervisor processor 560 via the SPI bus to setup and control image illumination. A strobe signal from the camera module 61 is utilized by the LED array module 83 to synchronize image illumination with the image sensor exposure duration.

The LED array module 83 includes two sets of high efficiency, high output infrared LEDs: LED bank A and LED bank B. Each set of the LEDs is driven by a separate current source. It is understood that more sets and/or visible types of LEDs may be used depending on design preference.

In normal operation, only one set of LEDs is required to properly illuminate targets and allow the camera module 61 to obtain target images. Each set of LEDs can be used alternately thereby increasing the lifetime of each set of LEDs. Failure of an LED, a set of LEDs, or a power supply will only affect one of the sets. The other set of LEDs will continue to operate. The failure will not render the LED array module 83 entirely unusable.

In one embodiment, the illumination controller 831 monitors various parameters and operations of the illumination module 83, such as temperature, power supply voltages and LED current to ensure proper operation. The voltages (V1, V2 and V3) across the LED banks are constantly monitored by the illumination controller 831 for determining currents flowing through the LED sets. The values of currents indicate whether the LED sets are working properly, whether one or more LED's are shorted, or whether there is an open circuit in of the LED banks. Any malfunction or deviation from a preset range or level is reported to the supervisor processor 560 by the illumination controller 831 via the SPI bus.

(4) The Wireless Communication Module

The wireless communication module 552 comports to one or more wireless communication standards, such as the Bluetooth standard, and performs wireless communication with the host computer system 100. An antenna, such as a Centurion D-Puck high gain antenna, is provided to transmit and receive wireless signals. A communication controller (not shown), such as a MC9208 microcontroller from Freescale, bridges the standard Bluetooth HCI UART interface of the communication module 552 with the SPI bus. In one embodiment, the communication module 552 is programmed to enter the Bluetooth defined Hold, Sniff or Park modes to conserve power during times of low usage. In another embodiment, the communication controller monitors various functions and/or parameters of the communication module 552, such as radio interface communications and power supply voltages to ensure proper operation. Any malfunctions and/or failures or variances from nominal are reported to the supervisor processor 560.

(5) The Spatial Relationship Sensor Module

Figure 18:
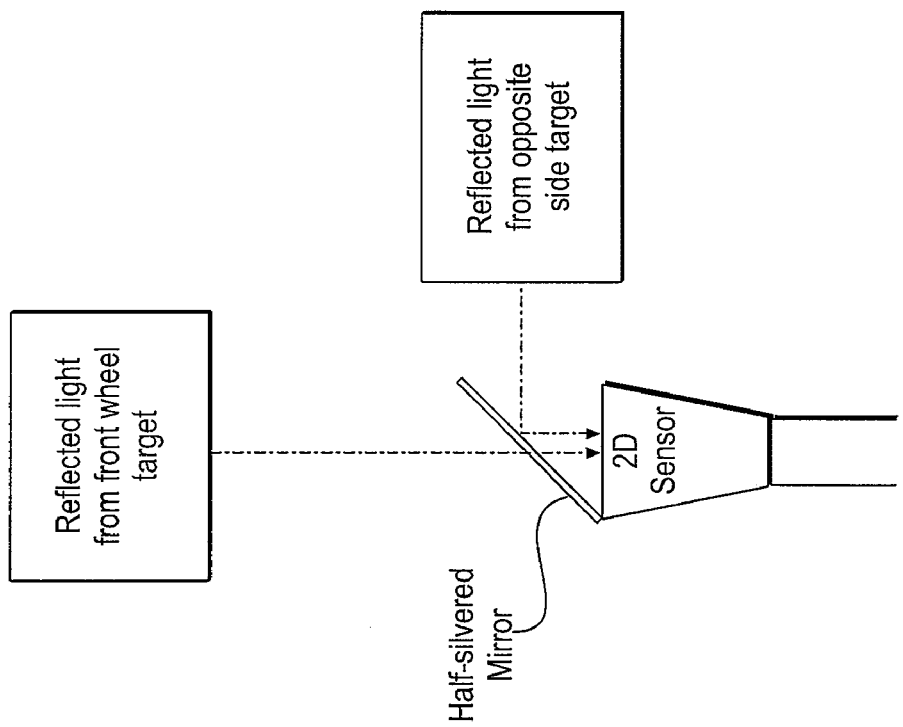

As discussed earlier relative to FIGS. 2, 6 and 18, the spatial relationship sensor module 65 accurately measures the horizontal angular relationship (cross toe) between sensing devices 55, 57. An image sensor, such as a linear CCD sensor with a 3648 pixel linear CCD, is disposed behind a slit or mask. A sensor controller (not shown), which may be implemented with a low power ARM 7 microcontroller, available, from Atmel Corporation, is provided to perform complex CCD timing and data acquisition. In one embodiment, in response to any activities of the spatial relationship sensor module 65 during a sleep mode, the sensor controller may send out an interrupt signal to interrupt and wake the supervisor processor 560, while the SPI interface is not active, by toggling the SPI bus slave out data line (MISO).

The sensor controller performs self tests and monitors various functions such as LED current and power supply voltages to ensure proper operation of the spatial relationship sensor module 65. In one embodiment, a unique test illumination device is provided for performing a self test of the spatial relationship sensor module 65. As described earlier related to FIGS. 6 and 19, the sensor module 65 includes the linear image sensor 87, which may be implemented using a 3648 pixel linear CCD, and an aperture 86 on a mask, for detecting a beam of light projected by a similar sensor module in the opposite head 57. An IR light from the opposing head 57 is sensed by the linear image sensor 87, via the aperture 86. The precise point on the sensor 87 at which the IR light from the other head is detected indicates the relative angle of incidence of the light from the opposite head at the sensor 87 in the head 55.

Figure 21:
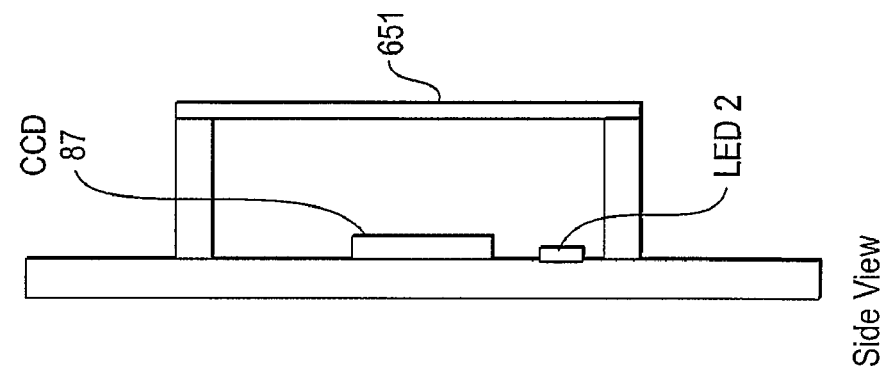
FIG. 21 shows the front and side views of an exemplary spatial relationship sensing module.
Figure 21:
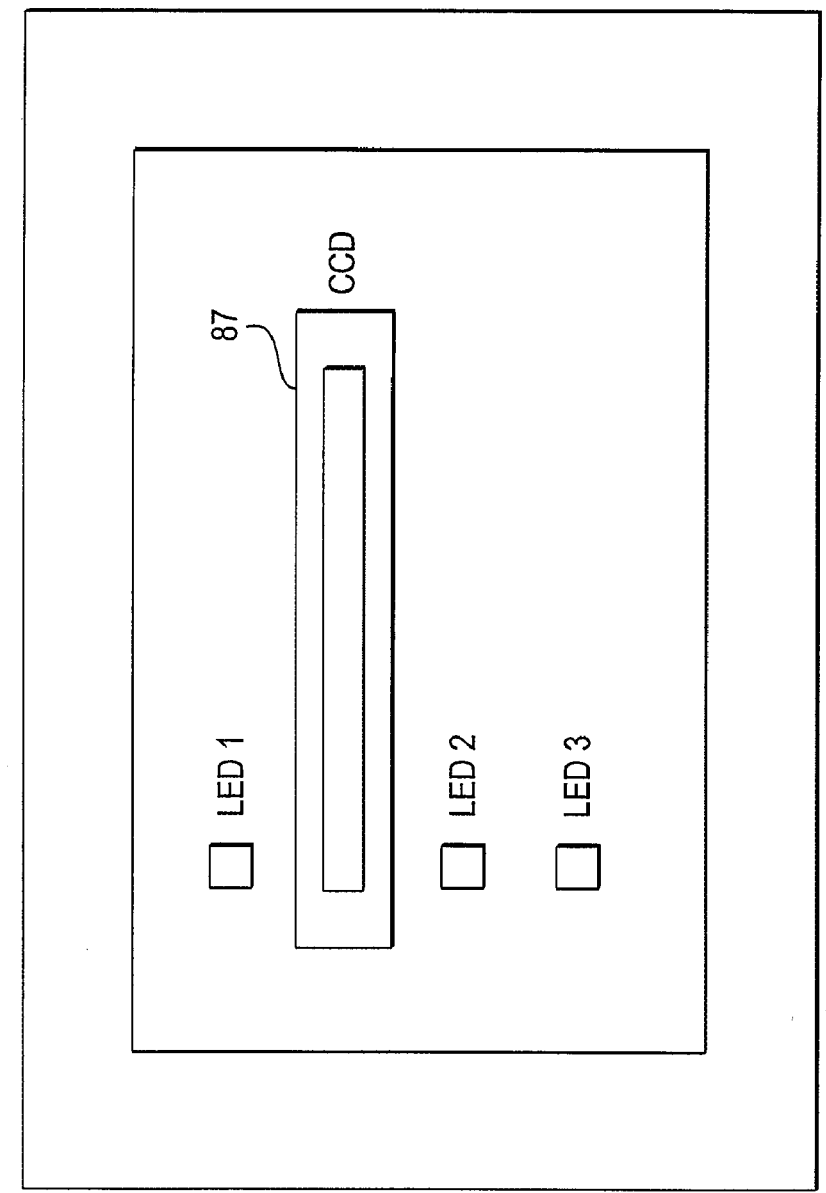

FIG. 21 illustrate front and side views of an exemplary spatial relationship sensing module 65 implemented with a test illumination device. As shown in the front view in FIG. 21, the spatial relationship sensing module 65 includes CCD 87, LED 1 and LED 3, and a test LED 2. LED 1 and LED 3 are disposed outside a mask 651 for projecting IR lights to a companion sensing head. In normal operation, only one of the two LED light sources is needed. Each is optimized to operation on a particular side of the vehicle. In the event that one of LED 1 and LED 3 fails, the other LED can use used in it place.

Test LED 2 and CCD 87 are disposed within the mask 651. The test LED 2 is designed to illuminate the entire CCD 87 on the same sensing head. The sensor controller of the spatial relationship sensor module may issue a command to control illumination of the test LED 2, for the purpose of performing a self test to determine whether the CCD 87 is in normal working condition. For instance, in the event that the spatial relationship sensing module 65 cannot obtain proper signals from the companion sensing head 57, the sensor controller may command the test LED 2 to illuminate the CCD 87. If image signals are properly generated by the CCD 87 in response to the illumination of the test LED 2, the sensor controller may determine that the CCD 87 is working properly. The lack of proper signals may be caused by a problem on the companion sensing head 57, an incorrect installation of the sensing heads, etc., but not from the CCD sensor 87. Furthermore, in response to the illumination of the test LED 2, pixels that deviate significantly from nominal or predetermined ranges or levels are flagged as weak or ineffective pixels. Data obtained from the flagged pixels are compensated for or thrown out during angle calculations. Factory and field calibration factors may be stored in the sensor controller internal flash memory and include checksums for data integrity. Any failures or variances from nominal will be reported by the sensor controller to the supervisor processor 560 via the SPI interface.

(7) The IR Transceiver Module

The IR transceiver module 554 is configured to establish a wireless communications link with the IR transceiver module of the other sensing head 57. The wireless communications link is based on the standard RS-232 protocol with each bit encoded into IR light burst modulated on a 500 KHz carrier frequency. The IR communications link can autonomously receive and transmit data even while the sensing head is in a sleep mode. It is understood that other types of wireless communications technology may be utilized to implement the wireless communications link between two sensing heads. The sensing head 55 utilizes the IR communications link to synchronize the sensor controller real time clock of the spatial relationship modules in the sensing heads 55, 57. In this way, the sensing head can perform alignment data acquisition cycles in a known relationship to the companion sensing head. In another embodiment, a sensing head may send a command via the IR communications link requesting the spatial relationship sensor on the companion sensing head begin a toe sensor data acquisition cycle based on a specific time or immediately upon an external trigger.

In still another embodiment, the wireless communication link between the companion sensing heads provides an alternative data transmission path to the host computer system 100, in addition to the wireless communication module 552.

Figure 22:
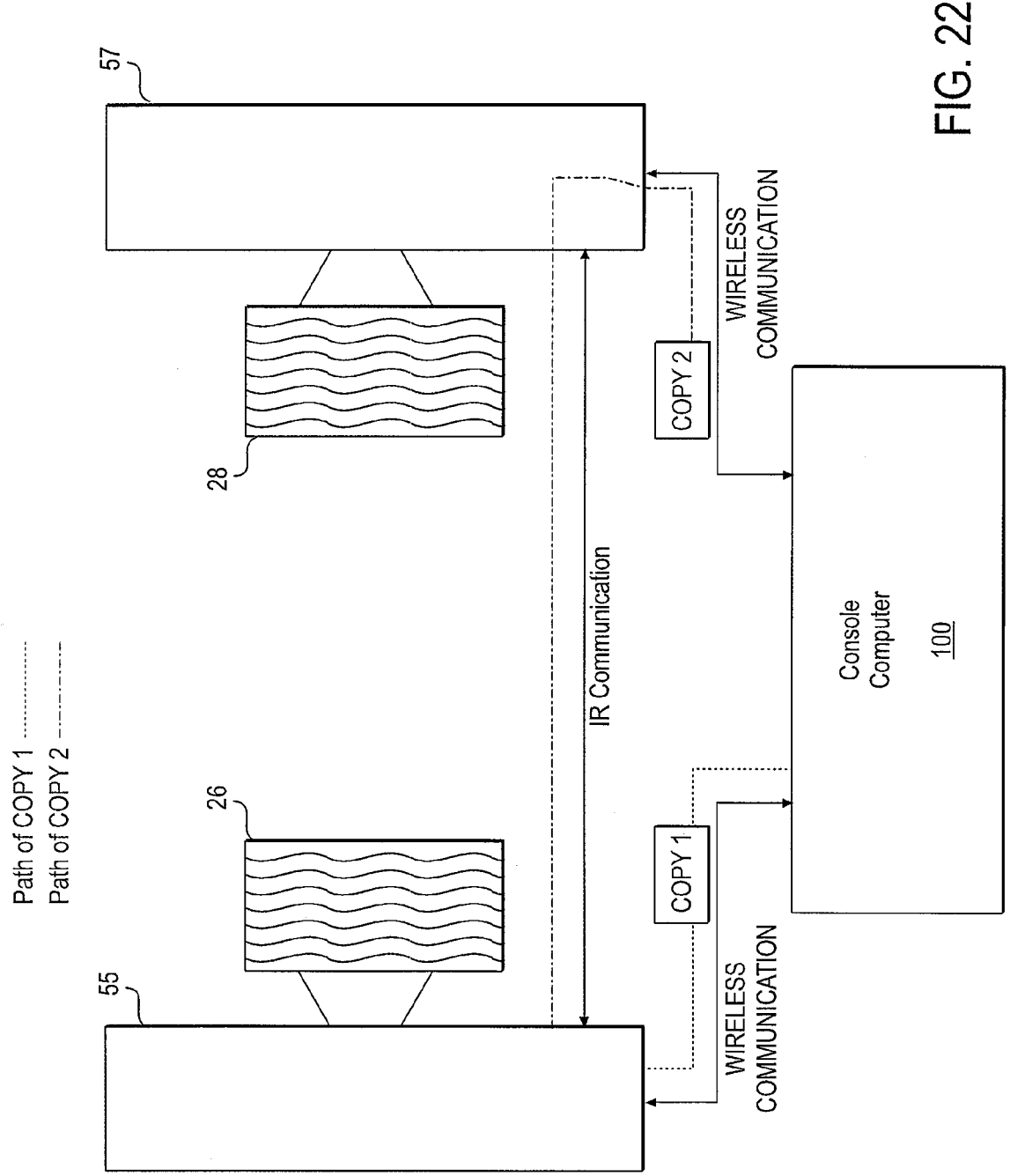
FIG. 22 illustrates transmission of data copies using two wireless communication paths.

As shown in FIG. 22, two communication paths between the sensing head 55 and the host computer system 100 are provided: a first communication path between the sensing head 55 to the host computer system 100 via the sensing head's wireless communication module, and a second communication path from the IR transceiver module 554 to the companion head 57 and then to the host computer system 100. The sensing head 55 sends the companion sensing head 57, via the IR transceiver module 554, a duplicate copy (copy 2) of data that the sensing head 55 generates and sends to the host computer system 100 via the companion sensing head's wireless communication module (copy 1). At the companion sensing head 57, the duplicate copy of data (copy 2) is relayed to the host computer system 100. Alternatively, the duplicate copy of data (copy 2) is combined with data sensed and generated by the companion sensing head 57, and the combined data is sent to the host computer system 100 via the wireless communication module of the companion sensing head 57. Similarly, the companion head 57 may transmit data to the sensing head 55 for being relayed to the host computer system 100. In a similar fashion, the host computer system sends commands and/or information to each sensing head via two communication paths: a first path via the wireless communication module of a sensing head, and a second path via the wireless communication module of a companion sensing head, for being relayed to the sensing head. In this way, two copies of data obtained by each sensing head and commands sent by the host computer system 100 are transmitted via different communication paths. This architecture improves communication reliability should any wireless communication modules of the companion sensing heads become intermittent or fail. In one embodiment, both transmission paths are used to transmit data from sensing heads 55, 57 to the host computer system 100 and commands from the host computer to the sensing heads 55, 57. In another embodiment, the transmission path alternative to using the wireless communication module 552 is a backup to the wireless communication module 552, and is utilized only when the wireless communication module 552 fails.

(8) The Tilt Sensor Module

The tilt sensor module 579 may be implemented using a two-plane, MEMS type inclinometer, capable of measuring both camber and sensing head pitch. Tilt controllers (not shown), such as a set of two Texas Instruments MPS430 ultra low power microcontrollers, each with an integrated temperature sensor and integrated SPI bus interface, are provided to process and communicate the angle data from the inclinometer to the supervisor processor 560 via the SPI interface.

The MEMS inclinometer is configured to perform a self test which deflects the internal micro-machined silicon beam by a constant amount. Evaluating this deflection by measuring the angle output change can determine if the inclinometer is defective or out of calibrations. Any failures or variances from nominal will be reported to the supervisor processor 560, to indicate an error in the respective module.

In one embodiment, an output from the inclinometer detecting a sensing head pitch is used to awake the sensing head to exit from the sleep mode and enter into a normal operation mode. The inclinometer pitch output is constantly monitored by the corresponding tilt controller. If a predetermined level of change occurs, signaling vibrations or activity around the vehicle or the sending head, the tilt controller toggles the SPI bus slave out data line (MISO) while the SPI interface is not active to interrupt and wake the supervisor processor 560 from the sleep mode.

According to another embodiment, during low or no activity (angle changes), the supervisor processor 560 successively reduces the frequency of data acquisition cycles that are used to retrieve data from the tilt sensor module and/or other functional modules. Between cycles, the supervisor processor 560 and other functional modules may enter into a sleep mode with most of the power supplies shut down for long periods of time. The inclinometer can detect very slight movements of the sensing head 55 indicating potential activity around the vehicle. Upon detecting this movement, the tilt controller signals the supervisor processor 560 to resume data acquisition cycles.

(9) The Potentiometer Module

A rotary potentiometer 577 encodes the angle of the shaft of sensing head 55 relative to the wheel/wheel clamp assembly. A potentiometer controller (not shown), which may be implemented using a Texas Instruments MPS430 microcontroller, converts the position detected by the potentiometer into shaft angle and communicates the angle data to the supervisor processor 560 via the SPI bus.

In one embodiment, factory and field calibration factors are calculated and stored in the tilt controllers and the potentiometer controller. Each controller monitors various functions and/or parameters including temperature and power supply voltages.

(10) The Bus and Interface System

As illustrated in FIG. 19, an exemplary sensing head of this disclosure utilizes a bus system complying with the SPI (Serial Peripheral Interface) standard, for performing communications between functional modules and the processor 89. A unique SPI multiplexer, which may be implemented using a programmable logic device, such as a CPLD (Complex Programmable Logic Device) or FPGA (Field Programmable Gate Array), is provided for coupling to the functional modules via slave SPI bus and to the processor 89 via a master SPI bus.

Figure 23:
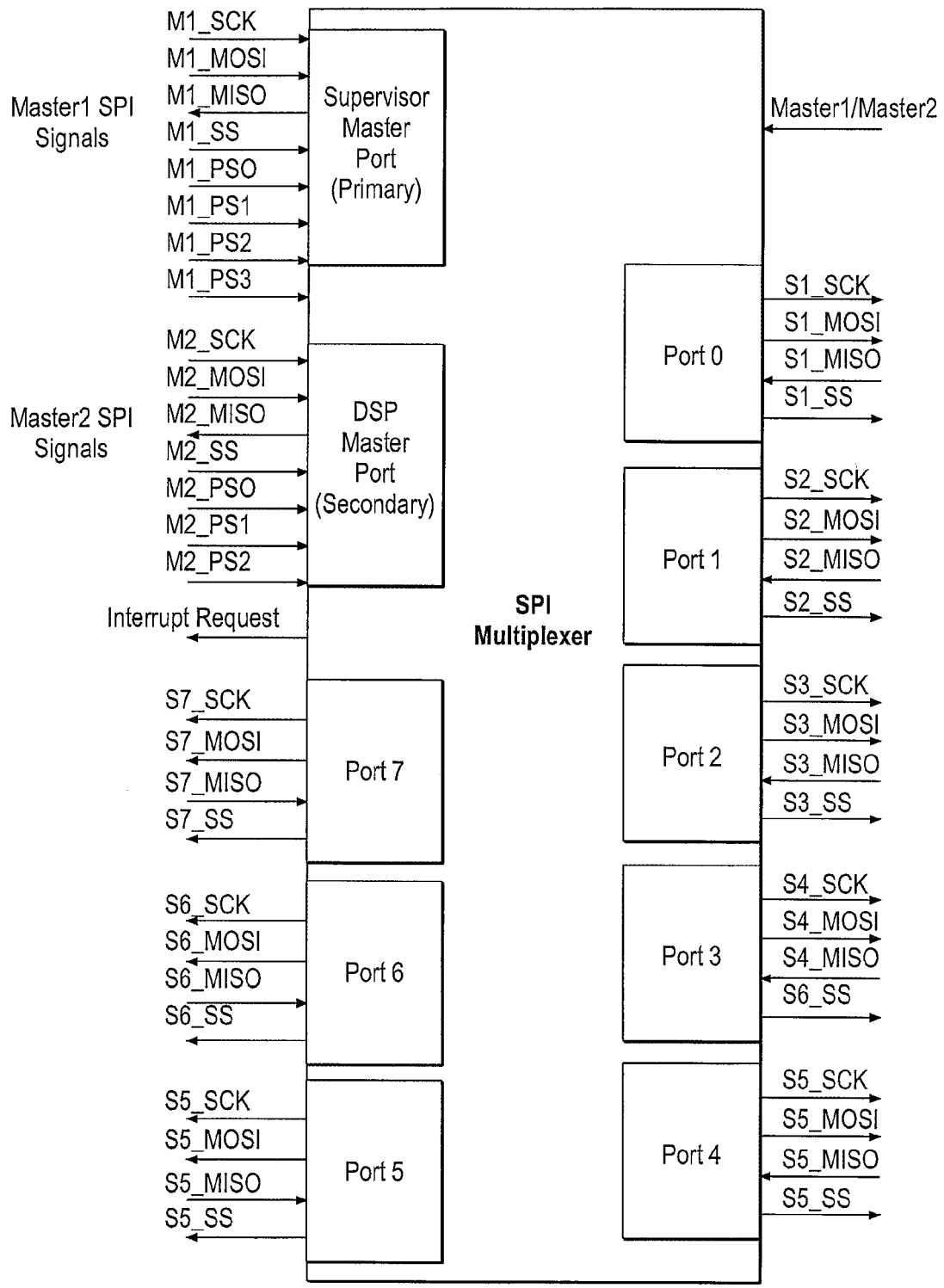
FIG. 23 is an exemplary circuit diagram of an exemplary SPI multiplexer.

FIG. 23 shows a block diagram of an exemplary SPI multiplexer. The SPI multiplexer provides seven slave ports (Port 0 through Port 7) for coupling to functional modules, and two master ports (primary master port and secondary master port), for optionally support multiple master controllers, such as the supervisor processor 560 and the DSP controller 561. A set of port select signals are used to select one and only one module slave SPI bus to be connected to the master SPI bus. These port select signals are driven by the master controller prior to initiating a standard SPI data transfer so as to connect the specific module intended for data communications.

The SPI multiplexer may also be programmed to support more than one master controller. For instance, a signal Master1/Master 2 selects one of the supervisor processor 560 and the DSP controller 561 as the SPI master controller. In this way, a secondary controller, such as the DSP controller 561, can assume control of the sensing head 55 in the event that the supervisor processor 560 fails. Each master port has a system clock line (M1_SCK, M2_SCK), a data transmission indication line (M1_MOSI (master out slave in) and M2_MOSI) indicating that data is transmitting from a master port to a selected slave port, a data receiving indication line (M1_MISO (master in slave out) and M2_MISO) indicating data is transmitting from a slave port to a master port, and a set of address lines (M1_PS0-M1_PS3 and M2_PS0-M2PS3) selecting one of the functional modules coupled to the slave ports. Each slave port has a system clock line (S1_SCK-S7_SCK), a data receiving indication line (S1_MOSI-S7_MOSI) indicating that data is transmitting from a master port to a selected slave port, a data transmission indication line (S1_MISO-S7_MISO) indicating data is transmitting from a slave port to a master port, and a slave selection line (S1_SS-S7_SS), a state of which indicates whether a specific slave port is selected and active for data communications.

As described earlier, power supplied to the functional modules may be partially or completely shut down when not in use or during a sleep mode, based on a control signal issued by the supervisor processor 560. In a conventional design where multiple modules are directly connected to the SPI bus without the SPI multiplexer, any un-powered module may load the bus, which possibly results in higher current requirements to drive the bus signals, loss of bus signal integrity, or even total bus failure. In addition, in a conventional multi-drop configuration, the identity of a faulty module can be ambiguous to the processor 89. In the architecture shown in FIG. 23, the functional modules are isolated from each other and the bus system by the SPI multiplexer, and the modules may be shutdown as required without affecting the loading or integrity of the SPI bus. In addition, the master controller may sequentially address each module during power on self test to ensure that each module is functioning properly. If a module failure is discovered, the master controller can identify the failed module such as based on an address associated with the failed module.

Furthermore, as described earlier, the SPI bus system and the SPI multiplexer are also programmed to allow an unselected functional module to request connection to the master SPI bus by driving a specific signal line, such as the MISO signal. By altering the state of the MISO signal while a functional module is not selected, the functional module causes the SPI multiplexer to provide an interrupt request signal to the master controller. The master controller may service this interrupt request by querying the SPI multiplexer for the specific module address requesting connection, and then select that module for connections and data communications. While slave ports in the example shown in FIG. 23 utilize MISO signal lines to indicate a service request, it is understood that a separate, dedicated signal line may be used to signal the service request.

While the above discussions utilize SPI standard as an example to explain operations of the unique combination of a bus system and multiplexer, it is understood that other types of multi-drop bus standards, such as Access Bus, EIA-422, EIA-485, I²C, IE Bus, LIN Bus, MI Bus, Microwire Bus, MOST, MPI Bus, SMbus, can also be used without deviating from the teachings of this disclosure. By implementing isolated selectable ports for each module versus direct connection, the overall system wide communication reliability is substantially improved.

(10) The Power Supply and Charge Subsystem

As illustrated in FIG. 19, sensing head 55 includes a power supply and charge subsystem that provides power to the sensing head 55. The power supply and charge subsystem includes the power supply 94, a charger 515, a charging connector 516, a gas gauge 514 and a battery 517.

The battery 517 includes one or more power storage units, such as rechargeable batteries, disposable batteries, chemical batteries, fuel cells, capacitive power storage devices such as super capacitors, etc., or any combinations thereof. In one embodiment, the battery 517 includes one or more Lithium-Ion or Li-Pol battery packs.

If rechargeable batteries are provided, the batteries can be charged by connecting the charging connector 516 to an external power source such as an AC or DC source. The charger 515 controls and regulates the charging current and voltage suitable for charging the battery 517. The power supply 94 is provided to convert the power supplied by the battery 517 and/or an external power source to a level suitable for the sensing head 55.

The gas gauge 514 monitors, measures and calculates multiple battery parameters and operation status, and provides various types of information related to the battery and/or charging condition, including current, available capacity, time-to-empty, time-to-full, state-of-charge, cell temperature, voltage, charging status, discharge and charge currents, low voltage thresholds, etc., and compensates for self-discharge, aging, temperature, and discharge rate. The gas gauge 514 may track the number of battery charge/discharge full cycles for predicting the remaining life of the battery 517. The information related to the battery 514 and charging conditions may be communicated to the user via the user interface 74. The gas gauge may be implemented with a bqJUNIOR series chips available from Texas Instruments, Inc.

In one embodiment, in addition to using an external power source, such as the shop AC power, to charge the battery 517, the charger 515 includes a backup power source for charging the battery 517 when the external power source is unavailable to the sensing head caused by power failure or disconnection of power line. The backup power source may be any types of power storage devices, such as rechargeable batteries, disposable batteries, chemical batteries, fuel cells, capacitive power storage devices like super capacitors or boost capacitors, etc., or any combinations thereof. The backup power storage device has a capacity sufficient to fully recharge a completely depleted battery 517.

When the shop AC power is available, the battery 517 may be recharged by the shop AC power or by the backup power storage device. When shop AC power is not connected or not available, the battery 517 is recharged by the backup power storage device only. This design enables the battery 517 to be recharged even when the shop AC power is completely turned off. The backup power storage device may be recharged during a regular recharge process when the shop AC power connects to the charging connector 516. Alternatively, the backup power storage device may be recharged separately, such as by adding fuel to fuel cells, or be replaced by another fully charged power storage device.

In another embodiment, an alignment system includes a docking device for detachably receiving the sensing heads and recharging the received sensing heads. When the sensing head is docked in the docking device, the battery 517 is recharged by an AC or DC power source connected to the docking device, and/or by a backup power storage device disposed in the docking device. This design does not require the backup power storage device to be part of the sensing heads, thereby reduces the overall weight of the sensing heads.

In another embodiment, the sensing head 55 includes an optional shock detection circuit utilizing a digital smart MEMs device that detects a free fall. A shock controller, which may be implemented by a Texas Instruments MPS430 microcontroller, acquires acceleration data from the smart MEMS device and records the time duration of the drop, to determine if a drop actually occurs and obtain and record information related to the drop, such as the time of fall and/or peak acceleration from the impact, for evaluation of damages and troubleshooting.

In addition to the exemplary self tests described earlier, each functional module monitors various functions and/or parameters including temperature, currents, and power supply voltages, etc. Factory and field calibration factors may be stored in the modules. A controller in each module determines an operation status of the module based on the data and the stored calibration factors. If it is determined that the functional module is not performing normally, an indication signal is sent to the supervisor processor 560 to indicate the fault.

As each functional module has the capability of performing self tests and diagnoses to isolate and identify a fault or an error, an exemplary alignment system implemented using the teachings of this disclosure provides highly useable information for diagnosis when the system does not operate as intended. In one embodiment, an audio and/or visual indicator, such as a single LED or LCD screen, disposed on the sensing head 55 is activated when the self diagnoses performed by the alignment system indicates that one or more functional modules or components are not working properly. In this case, the operator, based on the notification, knows for sure that the malfunction is not caused by inappropriate use or operation procedures, but from one or faulty components or modules of the alignment system, and a service request may be initiated. On the other hand, if the self tests and diagnoses performed by the functional modules reveal that the functional modules are working properly, a user interface, such as a visual or audio indicator or a signal port, provides output information indicating that the alignment head is in a normal working condition. With this information, if the operator encounters problems during an alignment process, the operator will have sufficient confidence that the problem is not caused by a malfunction of the alignment head, but may come from an improper operation or installation.

The self-diagnostic information may be stored in a non-volatile memory of the alignment system, for assisting repair and diagnosis of the system. In one embodiment, the self-diagnostic information is transmitted to a remote service center via a data transmission network coupled to the host computer 100, along with information of the specific alignment system, such as model number, serial number, etc., such that replacement parts and components may be ordered in advance, even before the faulty alignment system arrives to the service center. Remote diagnosis, repair and software update may be performed with remote access to the self-diagnostic information.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A sensing head for use in a wheel alignment system, comprising:
 one or more functional modules, each of which is configured to perform a function usable in obtaining measurements for calculating wheel alignment parameters of a vehicle, wherein the functional modules include at least one of:
  a wireless communication interface module configured to communicate in a wireless manner with a computer system or a companion sensing head attached to the vehicle;
  a spatial relationship sensing module configured to measure a spatial relationship between the sensing head and the companion sensing head;

an image sensing module configured to producing image data representing an image taken of a target associated with a vehicle wheel; and an illumination module configured to illuminate the target;

a data processor configured to calculate the measurements based on data received from the one or more functional modules;

wherein the one or more functional modules provide operation redundancy by utilizing at least one of:

providing multiple sets of illumination devices in the illumination module, wherein at least one set is independent from another set and is configured to illuminate the target independently;

providing multiple sets of illumination devices to the spatial relationship sensing module, wherein at least one set is independent from another set and is configured to independently generate a signal to the companion sensing head; and providing multiple processing units for implementing the data processor, wherein each processing unit is configured to independently perform the functions of the data processor.

2. The sensing head of claim 1, wherein the wireless communication interface includes a first wireless communication interface configured to communicate with the computer system and a second wireless communication interface configured to communicate with the companion sensing head.

3. The sensing head of claim 1 further providing multiple paths for communication with the computer system using the wireless communication module, wherein:

at least one of the paths is different from another path, and the one or more functional modules are configured to:

when one set of the illumination devices fails, switches operation to another set of illumination devices for illuminating the target;

when one path of the wireless communication with the computer system fails, switch to another communication path for communicating with the computer system;

when one set of the illumination devices of the spatial relationship sensing module fails, switch to another set of illumination devices for generating the signal to the companion sensing head; and when one of the processing units fails, switch operation to another processing unit for handling tasks of the failed processing unit.

4. The sensing head of claim 1, wherein the multiple sets of illumination devices are configured to illuminate the target alternately.

5. A sensing head for use in a wheel alignment system, comprising:

one or more functional modules, each of which is configured to perform a function usable in obtaining measurements for calculating wheel alignment parameters of a vehicle; and a data processor, coupled to the one or more functional modules, configured to process data;

wherein:

at least one of the functional modules is configured to perform a self test of a respective functional module; and the data processor determines an operation condition of the respective functional module based on data related to the self test performed with respect to the respective functional module.

6. The sensing head of claim 5, wherein an indication signal indicating a malfunction of the sensing head is generated based on the data related to the self test performed with respect to the respective functional module.

7. The sensing head of claim 6, wherein the indication signal identifies at least one faulty functional module based on the self test performed with respect to the respective functional module.

8. The sensing head of claim 5, wherein the one or more functional modules include at least one of:

a spatial relationship sensing module for measuring a spatial relationship between the sensing head and a companion sensing head;

an image sensing module for producing image data representing an image taken of a target associated with a vehicle wheel;

an inclinometer;

a rotary sensor;

a wireless communications module; and an illumination module configured to illuminate the target.

9. The sensing head of claim 8, wherein:

the self test with respect to the image sensing module is performed by producing a test signal associated with the image sensing module;

the spatial relationship sensing module includes an image sensor for sensing a signal projected from the companion sensing head, an emitting device for projecting a signal to be sensed by the companion sensing head, and a test emitting device configured to illuminate the image sensor on the spatial relationship sensing module;

the self test with respect to the spatial relationship sensing module is performed by commanding the test emitting device to illuminate the image sensor and determine an operation condition of the image sensor of the spatial relationship sensing module based on signals generated by the image sensor of the spatial relationship sensor in response to the illumination by the test emitting device;

the inclinometer is implemented with MEMS sensor; and the self test with respect to the inclinometer is performed by self-generating a beam deflection in the MEMS sensor and analyzing the signal generated by the beam deflection.

10. The sensing head of claim 5, wherein responsive to at least one of the functional modules having an abnormal operation condition, the data processor generates a control signal to turn off the power to the abnormal functional module or to isolate the abnormal functional module from a data bus coupling the abnormal functional module to the data processor or another functional module.

11. The sensing head of claim 5 further comprising a user interface, wherein responsive to at least one of the functional modules having an abnormal operation condition, the user interface conveys information indicating that the sensing head is not working properly.

12. The sensing head of claim 5 further comprising a user interface, wherein if the data processor determines that the one or more functional modules are working properly, the user interface conveys information indicating that the sensing head is in a normal operation condition.

13. A sensing head for use in a wheel alignment system, comprising:

means for performing at least one function usable in obtaining measurements for calculating wheel alignment parameters of a vehicle; and data processing means, coupled to the means for performing at least one function, for processing data; and self test means for performing a self test of the means for performing at least one function;

wherein the data processing means determines an operation condition of the means for performing at least one function based on a result of the self test.

14. The sensing head of claim 13 further comprising user interface means for conveying information to a user, wherein:
the self test means identifies at least one component in the sensing head that is not working properly based on the result of the self test; and
the user interface means indicates that the sensing head is not working properly or conveys information identifying the at least one component that is not working properly.

15. The sensing head of claim 13 further comprising user interface means for conveying information to a user, wherein if the data processing means determines that the means for performing at least one function is working properly, the user interface means conveys information indicating that the sensing head is in a normal operation condition.

16. A sensing head for use in a wheel alignment system for producing data usable in calculating alignment parameters, the sensing head comprising:
a housing for mounting on a wheel of a vehicle to be measured by operation of the wheel alignment system;
a wireless communication module configured to communicate, in a wireless manner, with a remote computer system or a companion sensing head attached to the vehicle, wherein the wireless communication module performs a selection selecting at least one communication path from the following communication paths, for transmitting data to the remote computer:
(1) a first wireless communication path formed between the sensing head and the remote computer system; and
(2) a second wireless communication path including a communication path from the sensing head to the computer system through a companion sensing head mounted on another wheel of the vehicle;
wherein:
a failure that occurs to one of the first wireless communication path and the second wireless communication path does not affect the operation the other communication path.

17. The sensing head of claim 16, wherein:
a command from the computer system is transmitted to the sensing head via at least one of the first wireless communication path and the second wireless communication path.

18. The sensing head of claim 16, wherein:
the wireless communication module includes a first wireless communication module configured to communicate with the computer system in a wireless manner; and a second wireless communication module configured to communicate with the companion sensing head in a wireless manner.

19. The sensing head of claim 16, wherein the data generated by the sensing head is transmitted to the computer system using both the first wireless communication path and the second wireless communication path.

20. The sensing head of claim 16, wherein:
the data generated by the sensing head is transmitted to the computer system using only one of the first wireless communication path and the second wireless communication path; and
when the one of the wireless communication paths fails, the other one of the wireless communication paths is activated to transmit the data to the computer system.

21. The sensing head of claim 18, wherein:
the second wireless communication module receives data produced by the companion sensing head; and
the first wireless communication module transmits data generated based on the received data to the computer system.

22. The sensing head of claim 18, wherein:
the first wireless communication module receives a command intended for the companion sensing head from the computer system; and
the second wireless communication module transmits signals generated based on the received command, to the companion sensing head.

23. A sensing head for use in a wheel alignment system for producing data usable in calculating alignment parameters, the sensing head comprising:
a housing for mounting on a wheel of a vehicle to be measured by operation of the wheel alignment system;
a drop sensor configured to acquire data related to a drop of the sensing head;
a data storage device, coupled to the drop sensor, configured to store the data acquired by the drop sensor; and
a data processor configured to determine an occurrence of the drop based on the data acquired by the drop sensor.

24. The sensing head of claim 23, wherein the data related to the drop includes at least one of a time duration of the drop and an acceleration value during the drop.

* * * * *